(12) United States Patent
Asada et al.

(10) Patent No.: US 6,370,321 B1
(45) Date of Patent: Apr. 9, 2002

(54) OPTICAL DISC, A RECORDER, A PLAYER, A RECORDING METHOD, AND A REPRODUCING METHOD THAT ARE ALL USED FOR THE OPTICAL DISC

(75) Inventors: Shin Asada, Neyagawa; Kazuhiro Tsuga, Takarazuka; Kaoru Murase, Ikoma-gun; Tomoyuki Okada, Katano, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/662,312

(22) Filed: Sep. 14, 2000

Related U.S. Application Data

(62) Division of application No. 09/612,264, filed on Jul. 7, 2000, now Pat. No. 6,272,286.

(30) Foreign Application Priority Data

Jul. 9, 1999 (JP) ............................................. 11-195592

(51) Int. Cl.[7] .................................................. H04N 5/92
(52) U.S. Cl. ........................... 386/94; 360/60; 380/201; 386/126
(58) Field of Search ................................ 386/1, 33, 45, 386/94, 95, 125–126; 360/60; 380/201, 203; 705/57, 58; 713/165, 200, 201; H04N 5/92, 5/781, 5/76, 9/79

(56) References Cited

U.S. PATENT DOCUMENTS

| | | | |
|---|---|---|---|
| 5,715,356 A | 2/1998 | Hirayama et al. | |
| 5,923,627 A | 7/1999 | Miwa et al | |
| 6,031,963 A | 2/2000 | Kitamura et al. | |
| 6,160,952 A | 12/2000 | Mimura et al. | |
| 6,272,286 B1 * | 8/2001 | Asada et al. | 386/126 |

FOREIGN PATENT DOCUMENTS

| | | |
|---|---|---|
| CA | 2182260 | 2/1997 |
| EP | 0724264 A2 | 7/1996 |
| EP | 0737008 A2 | 10/1996 |
| EP | 0789361 A2 | 8/1997 |
| EP | 0795859 A2 | 9/1997 |
| EP | 0795871 A2 | 9/1997 |
| JP | 9-51501 | 2/1997 |
| JP | 9-252450 | 9/1997 |

* cited by examiner

*Primary Examiner*—Thai Tran
(74) *Attorney, Agent, or Firm*—Wenderoth, Lind & Ponack, L.L.P.

(57) ABSTRACT

A video object is recorded on an optical disc. The video object is composed of at least one video object unit, and each video object unit contains control information and video data and has a presentation time of one second or shorter. The control information relates to display control and copying control for the video object unit.

5 Claims, 24 Drawing Sheets

FIG. 13

NTSC "ASPECT RATIO" CONVERSION TABLE

| b1 | b2 | MEANING | DCI(ASPECT RATIO) |
|---|---|---|---|
| 0 | 0 | 4 : 3 | 0000b |
| 0 | 1 | 16 : 9 LETTERBOX | 1101b |
| 1 | 0 | 16 : 9 | 0001b |
| 1 | 1 | UNDEFINED | (DCI_SS=00b) |

FIG. 14

PAL plus "ASPECT RATIO" CONVERSION TABLE

| b3 | b2 | b1 | b0 | MEANING | DCI(ASPECT RATIO) |
|---|---|---|---|---|---|
| 1 | 0 | 0 | 0 | 4 : 3 | 0000b |
| 0 | 0 | 0 | 1 | 14 : 9 LETTERBOX(CENTER) | 1000b |
| 0 | 0 | 1 | 0 | 14 : 9 LETTERBOX(TOP) | 0100b |
| 1 | 0 | 1 | 1 | 16 : 9 LETTERBOX(CENTER) | 1101b |
| 0 | 1 | 0 | 0 | 16 : 9 LETTERBOX(TOP) | 0010b |
| 1 | 1 | 0 | 1 | >16 : 9 LETTERBOX(CENTER) | 1011b |
| 1 | 1 | 1 | 0 | 14 : 9 | 0111b |
| 0 | 1 | 1 | 1 | 16 : 9 | 0001b |

FIG. 15

"SUBTITLING MODE" CONVERSION TABLE

| b9 | b10 | MEANING | DCI(SUBTITLE) |
|----|-----|---------|---------------|
| 0  | 0   | NO SUBTITLES | 00b |
| 0  | 1   | SUBTITLE IN ACTIVE IMAGE AREA | 01b |
| 1  | 0   | SUBTITLE OUT OF ACTIVE IMAGE AREA | 10b |
| 1  | 1   | UNDEFINED | 00b |

FIG. 16

"FILM/CAMERA MODE" CONVERSION TABLE

| b4 | MEANING | DCI(film/camera) |
|----|---------|------------------|
| 0  | CAMERA MODE | 0b |
| 1  | FILM MODE | 1b |

FIG. 18

"CGMS" CONVERSION TABLE

| b7 | b8 | MEANING | CCI(CGMS) |
|---|---|---|---|
| 0 | 0 | COPY IS PERMITTED | 00b |
| 0 | 1 | UNDEFINED | 01b |
| 1 | 0 | FIRST-GENERATION COPY IS PERMITTED TO BE GENERATED | 11b (COPYING IS PROHIBITED) |
| 1 | 1 | COPYING IS PROHIBITED | (RECORDING STOP INSTRUCTION OUTPUTTED) |

FIG. 19

"APSTB" CONVERSION TABLE

| b9 | b10 | MEANING | CCI(APSTB) |
|---|---|---|---|
| 0 | 0 | NEITHER AGC PULSE NOR COLORSTRIPE OPERATION | 00b |
| 0 | 1 | AGC PULSE IS VALID, BUT NO COLORSTRIPE OPERATION | 01b |
| 1 | 0 | VALID AGC PULSE AND COLORSTRIPE OPERATION 2L MODE | 10b |
| 1 | 1 | VALID AGC PULSE AND COLORSTRIPE OPERATION 4L MODE | 11b |

FIG. 20

"SOURCE" CONVERSION TABLE

| b11 | MEANING | CCI(Source) |
|---|---|---|
| 1 | ANALOG PRE-RECORDED MEDIA | 0b |
| 0 | OTHERS | 1b |

OPTICAL DISC, A RECORDER, A PLAYER, A RECORDING METHOD, AND A REPRODUCING METHOD THAT ARE ALL USED FOR THE OPTICAL DISC

This is a Rule 1.53(b) Divisional Application of Ser. No. 09/612,264, filed Jul. 7, 2000, now U.S. Pat. No. 6,272,286 B1.

BACKGROUND OF THE INVENTION (1) Field of the Invention

The present invention relates to an optical disc from and into which a read and a write can be performed and recording and reproducing methods to record and reproduce data on the optical disc. More specifically, the present invention relates to an optical disc on which video data is recorded, and recording and reproducing methods used for such optical disc.

(2) Description of the Related Art

DVD-RAM (Digital Video Disc-Random Access Memory) has been recently developed in the field of rewritable optical discs. A DVD-RAM is a phase change optical disc with a several-GB capacity that exceeds the conventional limits of around 650 MB.

DVD-RAMs can be used by computers to store various kinds of data. In addition, there are hopes that DVD-RAMs will be used to record AV (audio video) data for audio and video. While common conventional recording devices such as video tape recorders (VTRs) record audio and video onto a magnetic tape, there are hopes that such recording will be performed by optical disc recorders that use optical discs.

An optical disc recorder/player that can be used in place of a standard VTR receives a TV (television) broadcast, converts (compresses) a TV signal in the received broadcast into digital AV data, and records the digital AV data onto a DVD-RAM. When reproducing the AV data, the optical disc recorder/player reads the AV data from the DVD-RAM, converts the read AV data into an analog AV signal, and outputs it to a display unit. The generated AV data conforms to MPEG (Motion Picture Expert Group) prescribed in ISO/IEC 13818 (International Standardization Organization/International Electrotechnical Commission).

With some recent analog TV broadcasts, digital data is multiplexed into a TV signal during a vertical blanking interval (hereafter called "VBI", with the digital data multiplexed during a VBI being called "VBI data"). In teletext broadcasting, for instance, text data is multiplexed as VBI data during VBIs.

In a TV (or video) signal conforming to NTSC (National Television System Committee) system, one frame (i.e., two fields) is composed of 525 horizontal scanning lines, and VBI data can be multiplexed during a period that corresponds to the tenth to twenty-first horizontal scanning lines during a VBI and a period that corresponds to the 273rd to the 284th scanning lines during a VBI.

In addition to text data, VBI data can be information such as letterbox control information and copy control information. The letterbox control information is used to control display of an image with an aspect ratio of 4:3 on a display screen with an aspect ratio of 16:9 or 14:9. The copy control information shows whether VTRs are permitted to record the images. A method to multiplex such information as VBI data is defined, for instance, in Journal of the Institute of Television Engineers of Japan vol. 49 No. 9 (1995), and ETS300 294 (European Telecommunications Standards) "Television Systems 625-Line Television Wide ScreenSignaling (WSS)".

The letterbox control information and the copy control information are multiplexed into a program or a commercial. As the VBI data can be multiplexed into each field, it is possible to change, for instance, display and copy protection settings only for a certain commercial by multiplexing VBI data into the certain commercial. More specifically, it is possible to change an aspect ratio of a display image and/or allow copying only for commercials by multiplexing appropriate VBI data during the commercial periods.

VTRs for S-VHS (Super Video Home System) are capable of recording a TV signal including VBI data onto a magnetic tape, reproducing the TV signal, and having the TV signal displayed on a display unit. This allows the display unit to recognize the multiplexed VBI data such as letterbox control information and to control the displaying of a letterbox image in synchronization with the TV signal.

However, when a conventional optical disc recorder/player receives the TV broadcast, encodes an analog TV signal in the broadcast into compressed digital data, and records the compressed data onto an optical disc, any VBI data in the TV signal will be lost. As a result, the conventional optical disc recorder/player cannot change the display style or copying permission during fifteen or thirty-second commercial periods when reproducing AV data from an optical disc.

SUMMARY OF THE INVENTION

The present invention aims to provide an optical disc, an optical disc recorder, an optical disc player, an optical disc recording method, an optical disc reproducing method that can effectively use VBI data multiplexed into a video signal.

The above object can be achieved by an optical disc of on which at least one video object is recorded. Each video object contains at least one video object unit, and each video object unit contains control information and video data, and has a presentation time of one second or shorter. The control information relates to at least one of: (a) display control for the video object unit; and (b) copying control for the video object unit.

The above object can be also achieved by an optical disc recorder that records a video object onto a recordable optical disc, including: an extracting unit for extracting data that has been multiplexed into an audio-video signal, the data relating to at least one of: (a) display control; and (b) copying control; an encoding unit for encoding the audio-video signal to generate the video object containing at least one video object unit that has a presentation time of one second or shorter; an generating unit for generating, based on the extracted data, control information relating to at least one of: (a) display control for each video object unit in the video object; and (b) copying control for each video object unit in the video object; and a controlling unit for having the encoding unit to insert the generated control information into each video object unit.

The above object can be also achieved by an optical disc player that reproduces a video object recorded on an optical disc, the video object containing at least one video object unit that each has a presentation time of one second or shorter. The optical disc player includes: a reading unit for reading the video object from the optical disc; a separating unit for separating each video object unit in the read video object into video data, audio data, and control information; a decoding unit for decoding the video data and the audio data obtained by separating the video object unit to generate an audio-video signal corresponding to the video object unit; and a multiplexing unit for multiplexing additional data into the generated audio-video signal during vertical blanking intervals based on the control information that has been obtained by separating the video object unit.

Here, each video object may be generated from an analog video signal, and control information may indicate a content of data that is multiplexed into vertical blanking intervals in the analog video signal.

Here, the control information may show at least one of: (a) a display position for the video object unit; (b) copying management conditions for the video object unit; and (c) a source-material type for the video object unit.

With this construction, each video object unit contains control information, and so display control and copying control can be achieved for each video object unit, which is to say, different display and copying control can be performed for every second or lower. This enables to change, for instance, a display style or copying permission during a certain period, such as a commercial, of a program.

Here, each video object unit may contain one control pack and a plurality of video packs into which video data is placed. The control pack may be placed at a start of the video object unit and contains the control information.

For this construction, a control pack is located at a start of each video object unit. This simplifies an operation by an optical disc recorder to insert a control pack into each video object unit, and so can reduce the operation load of the optical disc recorder.

Here, the control information may further contain status information showing which parts of the control information are valid.

As control information additionally contains status information, it becomes possible to insert a video object unit having valid information regarding display and copying control and a video object unit having invalid information regarding display and copying control into the same video object.

Here, the control information may contain letterbox control information that shows a display position of images for the video object unit on a screen.

For this construction, an optical disc player can perform letterbox control for each video object unit, that is, for every second or lower.

Here, the control information may show an aspect ratio of images for the video object unit.

For this construction, an aspect ratio can be set, for each video object unit, in control information.

Here, the control information may contain subtitle mode information showing a display position of subtitles for the video object unit.

This allows an optical disc player to control a display position of a subtitle for each video object unit.

Here, the control information may contain film/camera mode information that shows whether a source material of the video object unit was recorded either by a television camera or on a movie film.

For this construction, film/camera mode can be set, for each video object unit, in control information.

Here, the control information may contain information regarding Copy Generation Managing System to show whether to permit the video object unit to be copied onto another recording medium.

With this construction, information regarding Copy Generation Management System can be set, for each video object unit, in control information.

Here, the control information may contain information regarding Analog Protection System (APS) to show a type of APS copy protection method used on an analog video signal based on which the video object unit was generated.

With this construction, information regarding Analog Protection System can be set, for each video object unit, in control information.

Here, the control information may contain source information that shows whether a source material of the video object unit is an analog pre-recorded package medium.

With this construction, source information can be set in control information for each video object unit.

Here, in addition to at least one video object that contains control information, at least one piece of stream information and a video objet that contains no control information may be recorded on the recordable optical disc. Each piece of stream information may be associated with at least one video object, and contain: aspect information that shows an aspect ratio of the at least one video object associated with the piece of stream information; and an application flag that shows either: (a) that the video object is encoded using the aspect ratio in the aspect information; or (b) that the video object is not necessarily encoded using the aspect ratio in the aspect information, and an aspect ratio in control information in each video object unit is used.

As this stream information is recorded separately from each video object, an optical disc player can obtain an aspect ratio in the stream information for each video object unit without needing to read the video object if an application flag is shown as "00b". In this way, the optical disc player can judge whether an aspect ratio of a video object or of each video object unit should be used for the video object, using the application flag. In addition, a size of a video object that contains no control information can be reduced by the size of this control information.

The above object can be also achieved by a recording to record a video object containing at least one video object unit onto an optical disc, including: an extracting step for extracting data that is multiplexed into an audio-video signal, the data relating to display control and copying control; an encoding step for encoding the audio-video signal to generate video data and audio data; a generating step for generating control information that relates to display control and copying control based on the extracted data; and a multiplexing step for multiplexing the control information, the video data, and the audio data that have been generated. into a video object unit having a presentation time of one second or shorter.

The above object can be also achieved by a reproducing method to reproduce a video object recorded on an optical disc, including: a reading step for reading the video object from the optical disc, the video object containing at least one video object unit that each has a presentation time of one second or shorter; a separating step for separating each video object unit in the read video object into video data, audio data, and control information; a decoding step for decoding the video data and the audio data obtained by separating the video object unit to generate an audio-video signal corresponding to the video object unit; and a multiplexing step for multiplexing additional data into the generated audio-video signal during vertical blanking intervals based on the control information that has been obtained by separating the video object unit.

The above object can be also achieved by a program that is recorded on a computer-readable recording medium and that has a computer perform a recording operation to record a video object containing at least one video object unit onto an optical disc. The recording operation includes: an extracting step for extracting data that is multiplexed into an audio-video signal, the data relating to display control and copying control; an encoding step for encoding the audio-video signal to generate video data and audio data; a generating step for generating control information that relates to display control and copying control based on the extracted data; and a multiplexing step for multiplexing the control information, the video data, and the audio data that have been generated into a video object unit having a presentation time of one second or shorter.

The above object can be also achieved by a program that is recorded on a computer-readable recording medium and that has a computer perform a reproducing operation to reproduce a video object recorded on an optical disc. The reproducing operation includes: a reading step for reading the video object from the optical disc, the video object containing at least one video object unit that each has a presentation time of one second or shorter; a separating step for separating each video object unit in the read video object into video data, audio data, and control information; a decoding step for decoding the video data and the audio data obtained by separating the video object unit to generate an audio-video signal corresponding to the video object unit; and a multiplexing step for multiplexing additional data into the generated audio-video signal during vertical blanking intervals based on the control information that has been obtained by separating the video object unit.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 13 shows a conversion table for an aspect ratio of an NTSC (National Television System Committee) signal;

FIG. 14 shows a conversion table for an aspect ratio of a PALplus (Phase Alternation by Line) signal;

FIG. 15 shows a conversion table for Film/Camera Mode;

FIG. 16 shows a conversion table for Subtitling Mode;

FIG. 18 shows a conversion table for CGMS (Copy Generation Managing System);

FIG. 19 shows a conversion table for APSTB (Analog Protection System Trigger Bits);

FIG. 20 shows a conversion table for Source Information;

DESCRIPTION OF THE PREFERRED EMBODIMENTS

The following defines technological terms used in this specification.

i) Video Object (VOB)

A video object (VOB) is stream data generated as a result of a real-time recording being performed once, and complies with a program stream prescribed in ISO/IEC 13181-1 "Information Technology—Generic Coding of Moving Pictures and Associated Audio Information: Systems". The VOB consists of at least one video object unit (VOBU) that is composed of video data and audio data. For the present invention, a VOBU additionally contains display control information and copy control information.

(ii) Video Object Unit (VOBU)

A VOBU is composed of at least one GOP (group of pictures), and contained in a VOB. Each VOBU has a reproduction time of 0.4 to 1.0 second although a VOBU at the end of a VOB may have a reproduction time shorter than 0.4 second, depending on when the recording stops. A VOBU is a pack sequence consisting of packs arranged in a recording order. A pack at a start of a VOBU is either a Video Pack or a Control Pack, and has a system header. When one VOBU in a VOB starts with a Control Pack, every VOBU in that VOB includes a Control Pack. When one VOBU in a VOB starts with a Video Pack, no VOBUs in that VOB include a Control Pack.

(iii) Group of Pictures (GOP)

A GOP is defined in ISO/IEC 13818-2 for the MPEG standard, and refers to picture data containing at least one I (Intra) picture that is a picture which has been encoded without other pictures (frames/fields) being referred to. A GOP can be reproduced independently of other data.

(iv) Packs

A pack has a fixed size of 2 KB, and can be classified as a Video Pack, an Audio Pack, or a Control Pack. Of these packs, a Control Pack is characteristic of the present invention. A Control Pack contains display control information and copy control information, and is arranged at a start of a VOBU.

1. Overview of an Optical Disc Recorder/Player

Figure 1:
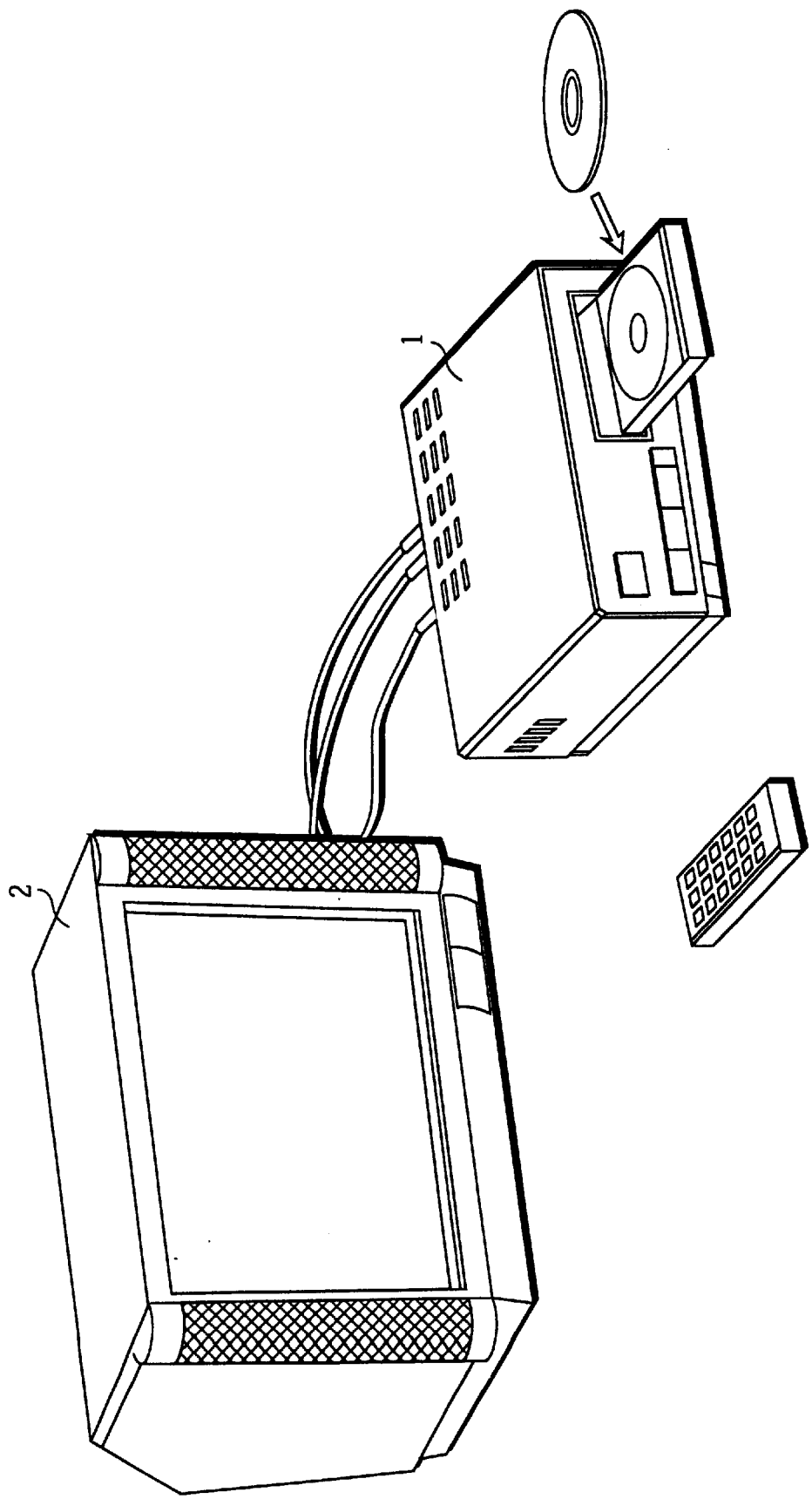
FIG. 1 shows an external view of an optical disc recorder/player, a television set, and a remote controller.

An optical disc recorder/player 1 of the present invention can be used in place of a standard VTR, and is connected to a TV set 2 as shown in FIG. 1. The present optical disc recorder/player 1 encodes an AV signal contained in a TV signal (or a video signal) into compressed AV digital data that is a VOB, records the VOB onto an optical disc, and reproduces the VOB on the optical disc.

When recording a VOB onto an optical disc, the present optical disc recorder/player 1 extracts VBI data from an analog TV (video) signal, and inserts a Control Pack containing information shown by the extracted VBI data into each VOBU that constitutes the VOB.

When reproducing a video signal from the VOB recorded on the optical disc, the optical disc recorder/player 1 multiplexes the VBI data into a video signal, which it has reproduced, according to information shown in each Control Pack. This allows a display unit to control, for each VOBU, a display style, such as an aspect ratio, and a permission of the copying, while the optical disc recorder/player 1 performs reproduction.

2. Construction of an Optical Disc
2.1 Physical Construction of the Optical Disc The present embodiment describes an optical disc, using a DVD-RAM as an example. The physical construction of the DVD-RAM is described in detail in Japanese Laid-Open Patent Application No. 8-7282 that discloses a method to record data on both lands and grooves, and in Japanese Laid-Open Patent Application No. 7-93873 that discloses Zone-CLV (constant linear velocity) and so will not be explained. The following describes a data construction unique to the present invention when it is embodied using a DVD-RAM.

2.2 Logical Construction of the Optical Disc

Figure 2:
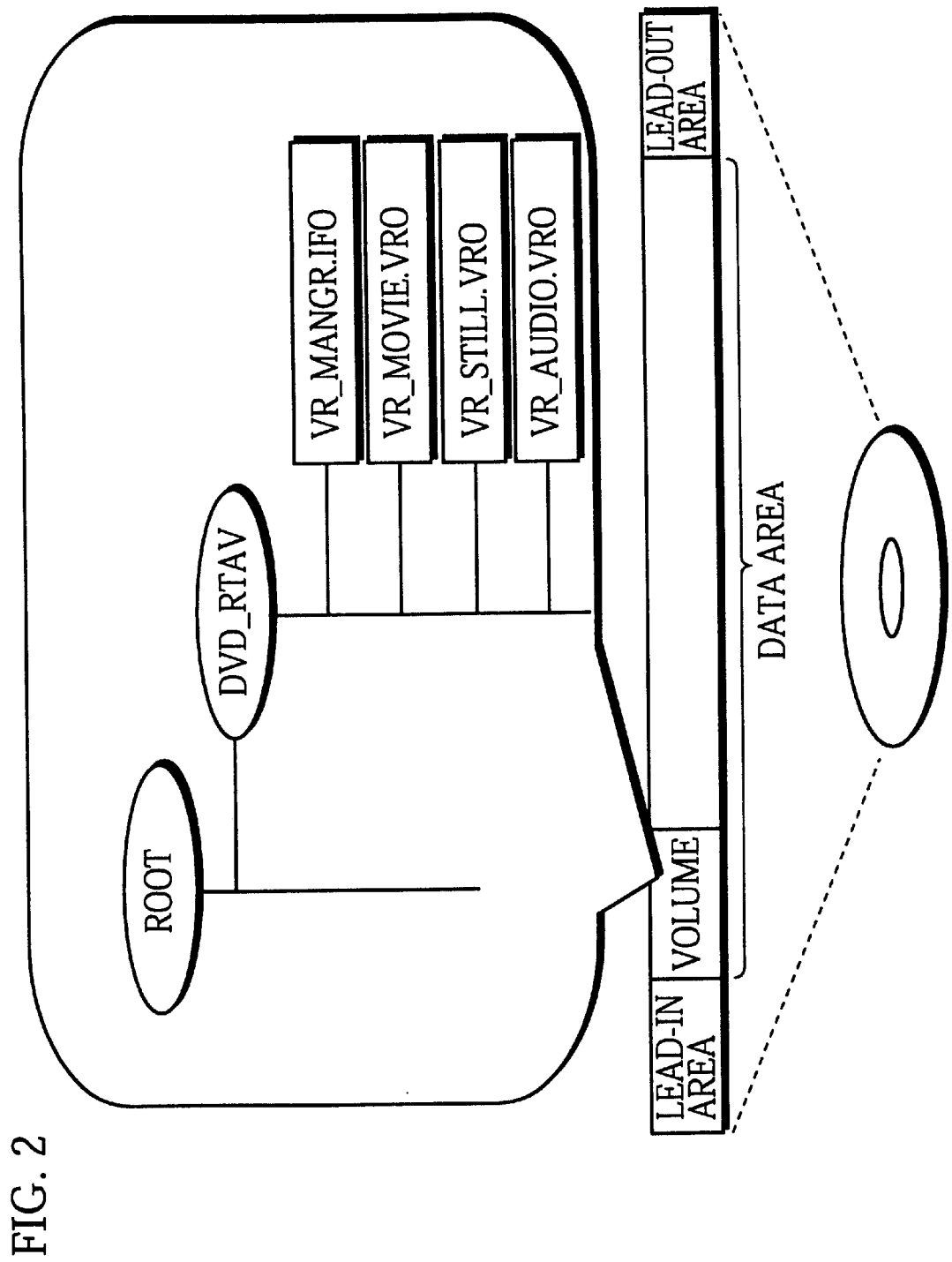
FIG. 2 shows a lead-in area, a data area, a lead-out area within a region of the optical disc, and a construction of files stored in the data area.

FIG. 2 shows a lead-in area, a data area, a lead-out area that are present within a region of the DVD-RAM, and an example construction of the files stored in the data area.

The lead-in area contains signals used by the optical disc recorder/player 1 to stabilize the servo controlling and identification signals to distinguish the DVD-RAM from other types of media. These signals are recorded at a start of the lead-in area (i.e., the innermost part) of the DVD-RAM. The data area is located next to the lead-in area, and stores files containing VOBs and management information. The lead-out area is present in the end of the DVD-RAM region (i.e., the outermost part of the disc), and contains signals similar to those stored in the lead-in area and other data.

At a start of the data area, volume information used for the file system is recorded. The file system is well known in the art, and so will not be described. The directories and files shown in this figure are accessed according to the file system.

In this file-directory construction, a DVD_RTAV (Real Time Audio Visual) directory is present directly below a root directory. The DVD_RTAV directory stores one management information file and one or more AV files that store VOBs. All the files stored in the DVD_RTAV directory can be classified as either a management information file or an AV file.

In the example shown in the figure, VR_MANGR.IFO is the management information file, and VR_MOVIE.VRO, VR_STILL.VRO, and VR_AUDIO.VRO are AV files, with the three AV files respectively being used to record video data (which may contain audio data), still picture data, and audio data.

2.2.1 AV Files

Figure 3:
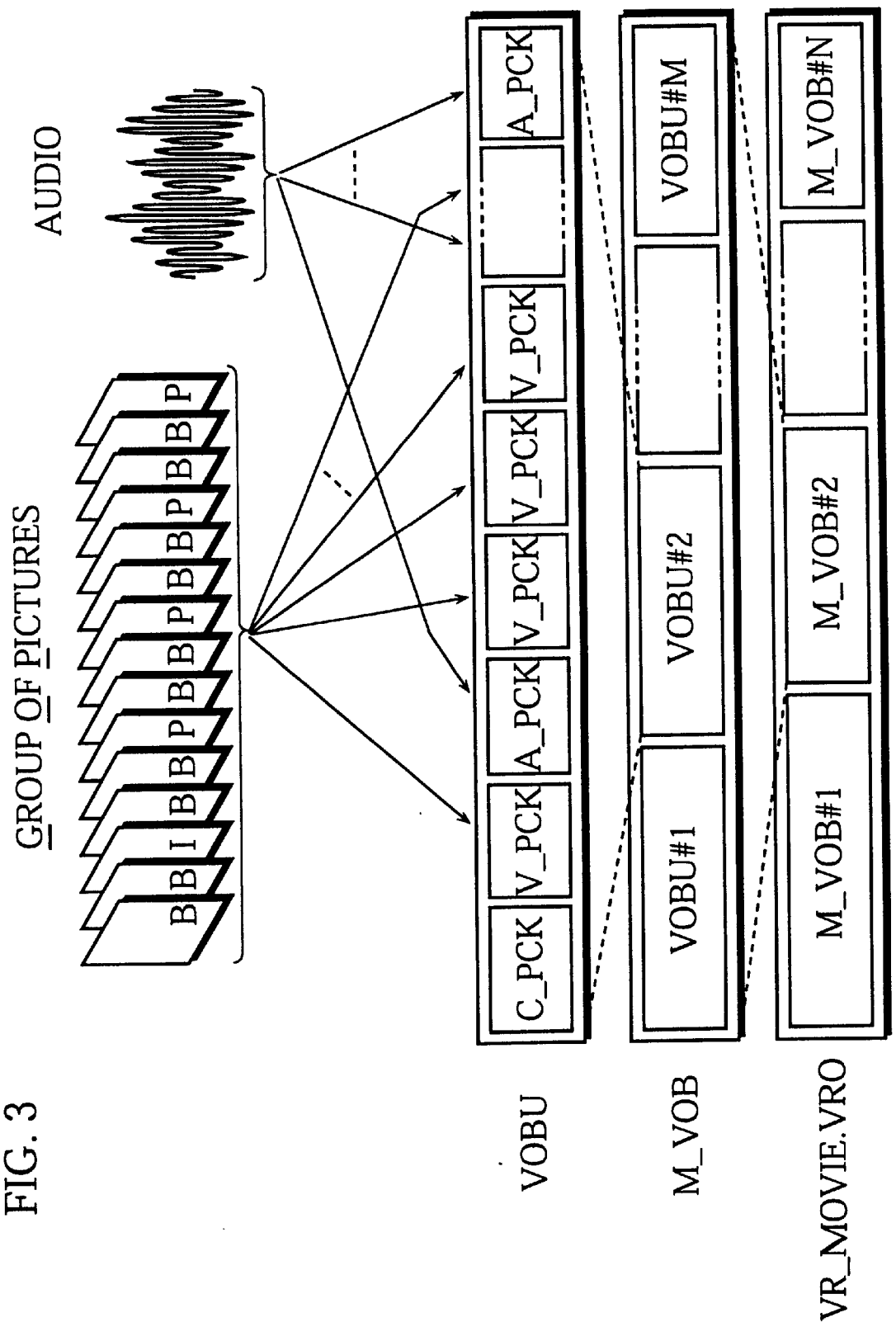
FIG. 3 shows a data construction of a VR_MOVIE.VRO file.

FIG. 3 shows a data construction of the VR_MOVIE.VRO file. In VR_MOVIE.VRO, a plurality of VOBs shown as M_VOB#1 to M_VOB#N are arranged. The N is a number "1" or higher, and a VOB in this VR_MOVIE.VRO file is called "M_VOB" to distinguish it from Still Picture_VOB (S_VOB) that is a VOB for still pictures although in this specification "VOB" represents an M_VOB unless otherwise specified.

Each M_VOB is composed of a plurality of VOBUs.

Each VOBU is a pack sequence that consists of a plurality of packs with a fixed size of 2 KB. Each pack can be classified as a control Pack (hereafter C_PCK), a Video Pack (V_PCK), or an Audio Pack (A_PCK).

A C_PCK is placed at a start of a VOBU, and contains display control information such as letterbox control information, and copy control information relating to the permission of the copying by a VTR or the like, and to the copy-guard system. Here, the letterbox control information is used to control display of an image with an aspect ratio of 4:3 on a display screen with an aspect ratio of 16:9 or 14:9. The optical disc recorder/player 1 generates the display control information and the copy control information based on VBI data multiplexed into a TV (video) signal when recording the video signal, and multiplexes DCI and CCI as the VBI data into a video signal being reproduced.

A V_PCK contains video data, and a plurality of V_PCKs contained in one VOBU correspond to a GOP (group of pictures). A GOP is divided into the payloads of a plurality of V_PCKs contained in the VOBU. While a GOP contains neither audio data nor control information, a VOBU contains a C_PCK and A_PCKs in addition to the V_PCKs corresponding to at least one GOP, and so different names are used to distinguish the two.

An A_PCK contains audio data encoded according to the MPEG audio system, the Dolby AC3, the liner PCM (pulse code modulation), or the like. V_PCKs and A_PCKs are interleaved within each VOBU.

2.2.1.1. Control Pack (C_PCK)

Figure 4:
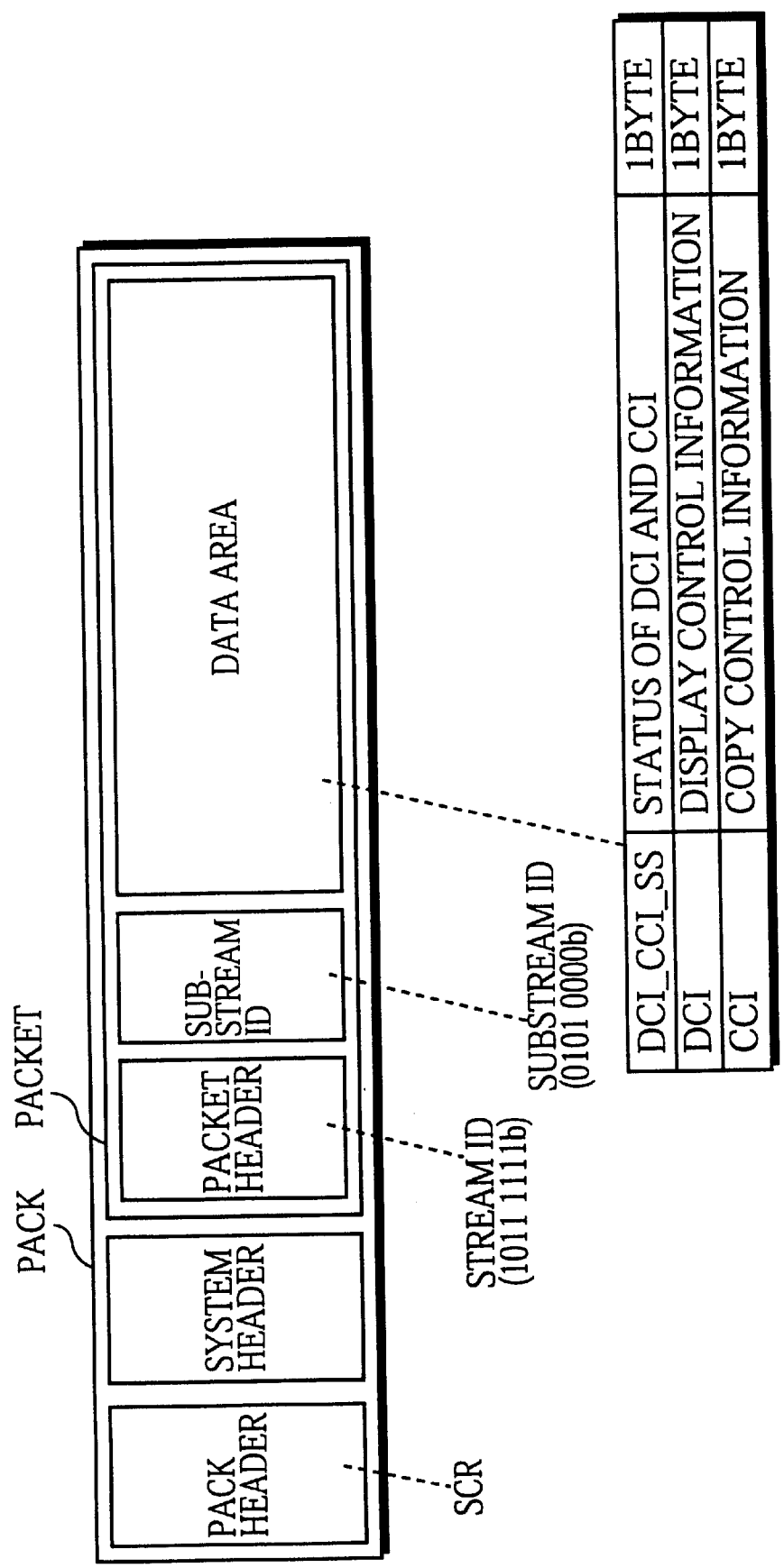
FIG. 4 shows a data construction of a control pack.

FIG. 4 shows a data construction of a C_PCK. As shown in the figure, the C_PCK is composed of a pack header (with a size of 14 B (byte)), a system header (24 B), and a packet (2010 B). The packet is composed of a packet header (6 B), a substream ID (1 B), and a data area (2003 B).

The pack header contains an SCR (System Clock Reference) that determines a position of the C_PCK within a VOBU.

The system header shows a boundary between different VOBUs. A C_PCK has this system header as the C_PCK is placed at a start of a VOBU.

The packet is placed into a payload of the C_PCK, and contains a packet header, a substream ID, and a data area.

The packet header contains a stream ID "1011111b" ("b" meaning a binary notation) that represents a "private stream 2" defined in the MPEG standard.

The substream ID is shown as "01010000b" indicating that the pack is a C_PCK.

The data area contains display control information (hereafter, DCI), Copy Control Information (CCI), and DCI_CCI_Status information (DCI_CCI_SS) that shows the status of the DCI and the CCI.

2.2.1.1.1 Display Control Information (DCI)

Figure 5:
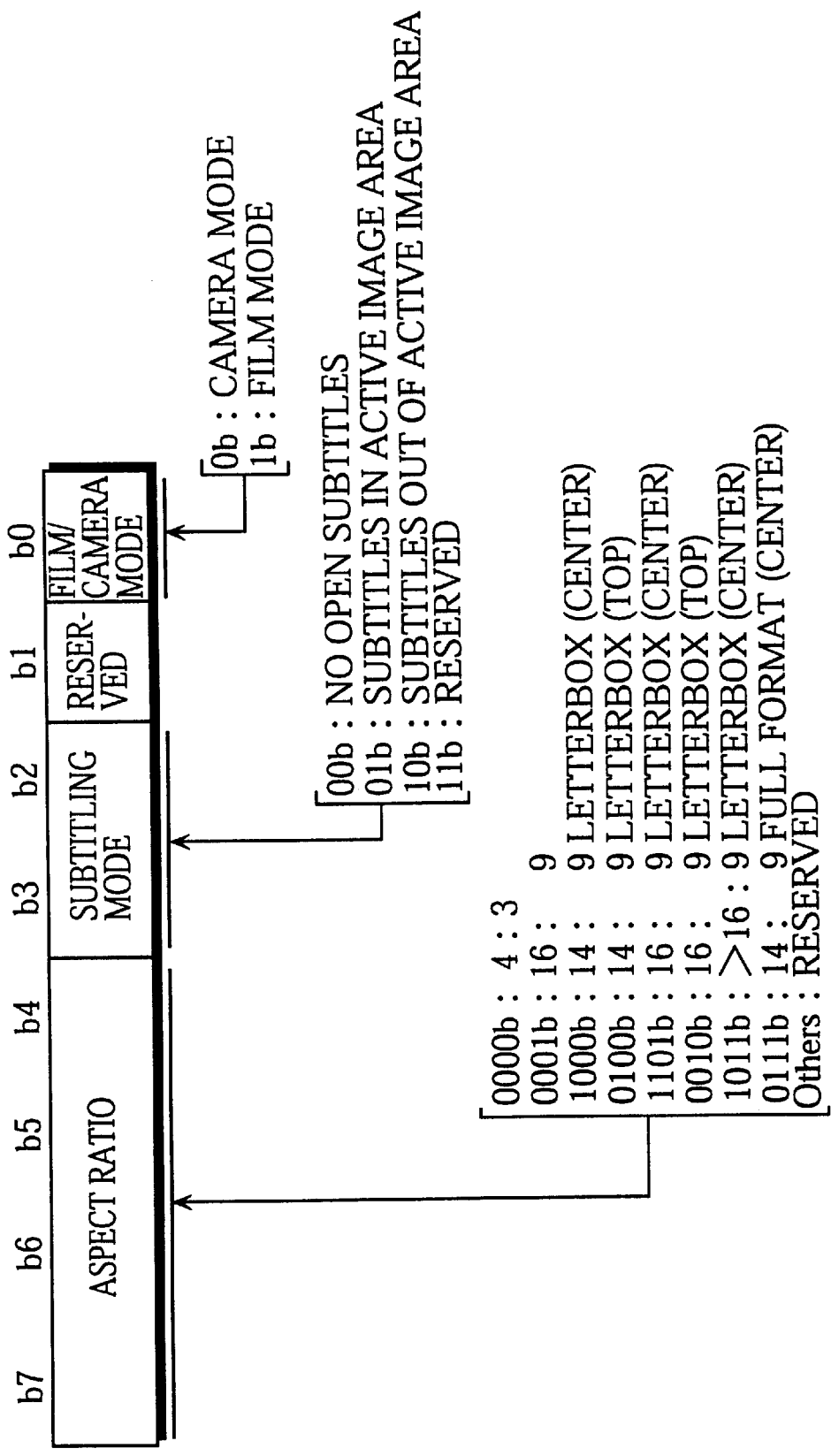
FIG. 5 shows a detailed bit configuration of display control information (DCI) in a control pack.

FIG. 5 shows a bit configuration of DCI in a C_PCK in detail. As shown in the figure, the DCI shows an Aspect Ratio, a Subtitling Mode, and a Film/Camera Mode.

The Aspect Ratio is 4-bit data showing how an image should be displayed according to a letterbox controlling.

The following describes the letterbox controlling.

Figure 6:
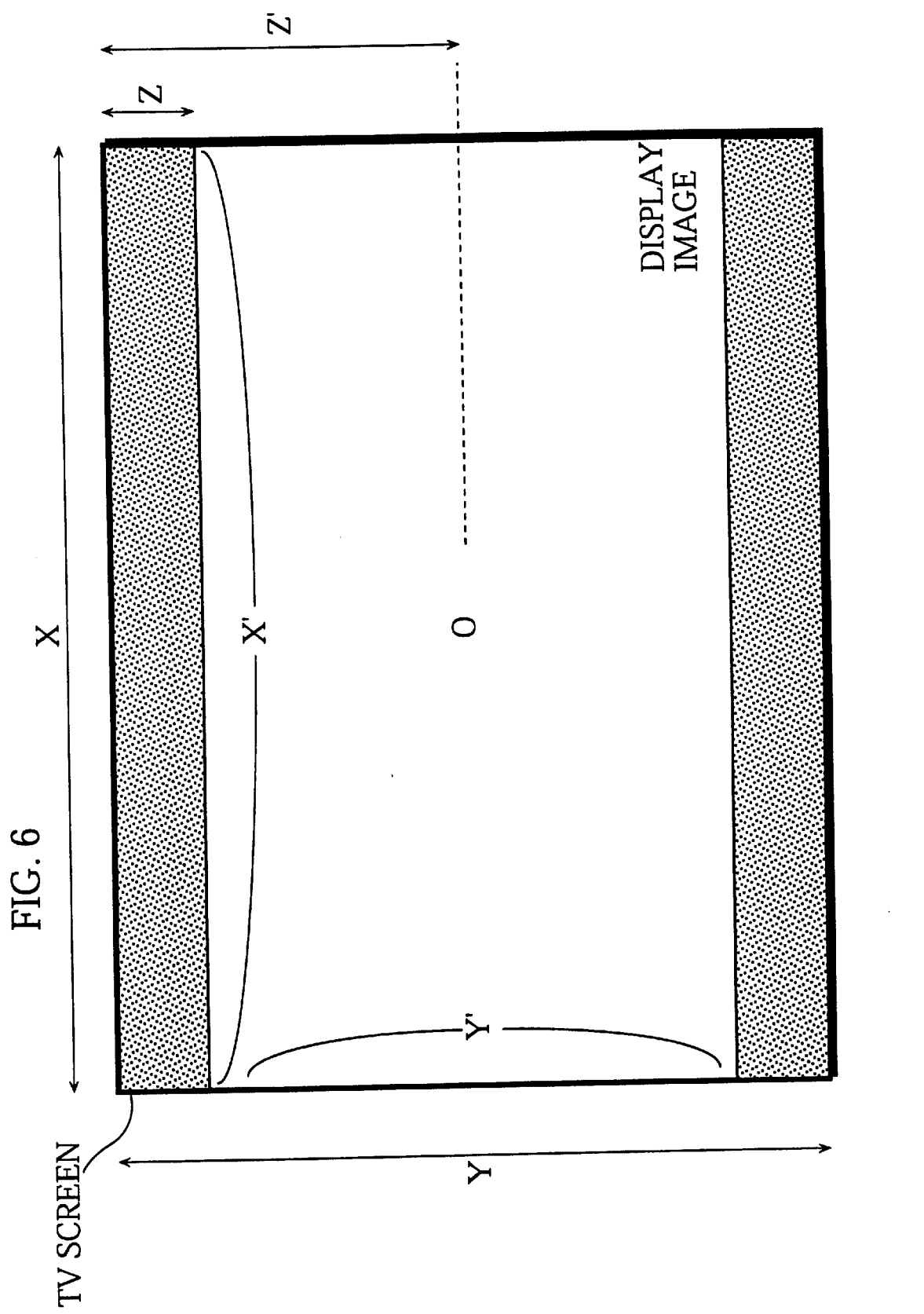
FIG. 6 shows a relationship between a screen size and a display image size.

FIG. 6 shows a relationship between a screen size and a display image size. The aspect ratio of a screen is shown as X:Y, and the aspect ratio of the display image is shown as X':Y'. A display image with the aspect ratio of X':Y' =16:9 or 14:9 is called a letterbox image. When such a letterbox image should be displayed on a screen with the aspect ratio of, for instance, 4:3, different display methods can be used, such as displaying the letterbox image with black bars in the top and bottom parts of the screen as shown in the figure, displaying the letterbox image in a top part of the screen with a black area below, or stretching the image in the vertical direction. The letterbox control information designates such a display method, and usually shows information regarding X':Y' and either Y:Z or Y:Z' measured from the center "O" of a display image.

The Aspect Ratio is shown as four bits (b4 to b7) and shows the following information.

000b: 4:3

0001b: 16:9

1000b: display a letterbox image with the aspect ratio of 14:9 in the center of the screen 0100b: display a letterbox image with the aspect ratio of 14:9 in a top part of the screen 1101b: display a letterbox image with the aspect ratio of 16:9 in the center of the screen.

0010b: display a letterbox image with the aspect ratio of 16:9 in a top part of the screen 1011b: display a letterbox image with the aspect ratio of 16 (or larger):9 in the center of the screen 0111b: display a letterbox image with the aspect ratio of 14:9 on the entire screen others: reserved In FIG. 5, the first two values ("0000b" and "0001b") show the aspect ratios of images, and the remaining values are used for the letterbox controlling. FIG. 6 is an example where the letterbox image with the aspect ratio of 16:9 is displayed in the center of the screen.

The Subtitling Mode is shown as two bits (b3 and b2) of the DCI, and indicates the following information.

00b=No subtitles

01b=subtitles in active image area

10b=subtitles out of active image area others=reserved

For the letterbox image in FIG. 6, the active image area refers to a part on the screen where the letterbox image is displayed, and the area that is "out of active image area" is the black parts at the top or bottom of the screen. For instance, PAL (Phase Alternation by Line) uses 625 scanning lines per frame for an image with an aspect ratio of 4:3, with 576 lines out of the 625 lines composing the image. On the other hand, a PAL letterbox image with an aspect ratio of 16:9 is composed of 430 lines out of the 625 scanning lines. When the Subtitling Mode shows "subtitle in active image area" for this PAL letterbox image, a subtitle is displayed on the 430-line display image. When the Subtitling Mode shows "subtitle out of active image area", a subtitle is displayed in a part (where black is displayed) corresponding to 145 scanning lines (576 minus 430 scanning lines).

Scanning lines other than the above 576 lines correspond to a VBI.

The Film/Camera Mode is shown as one bit (b0) of the DCI, and indicates the following information.

0b: Camera Mode

1b: Film Mode

The Film/Camera Mode is defined in PALplus that is a video image processing method used in Europe, and shows whether a source material of images is originally recorded by a TV camera or on a movie film.

Journal of the Institute of Television Engineers of Japan vol. 49 No. 9 (1995) describes the overview of the above display controlling based on the Aspect Ratio, the Subtitling Mode, and the Film/Camera Mode, and ETS300 294 (European Telecommunications Standards) "Television Systems 625-Line Television WSS" explains such display control in detail.

The above bit configuration of the DCI can be used for both PAL and NTSC images.

2.2.1.1.2 Copy Control Information (CCI)

Figure 7:
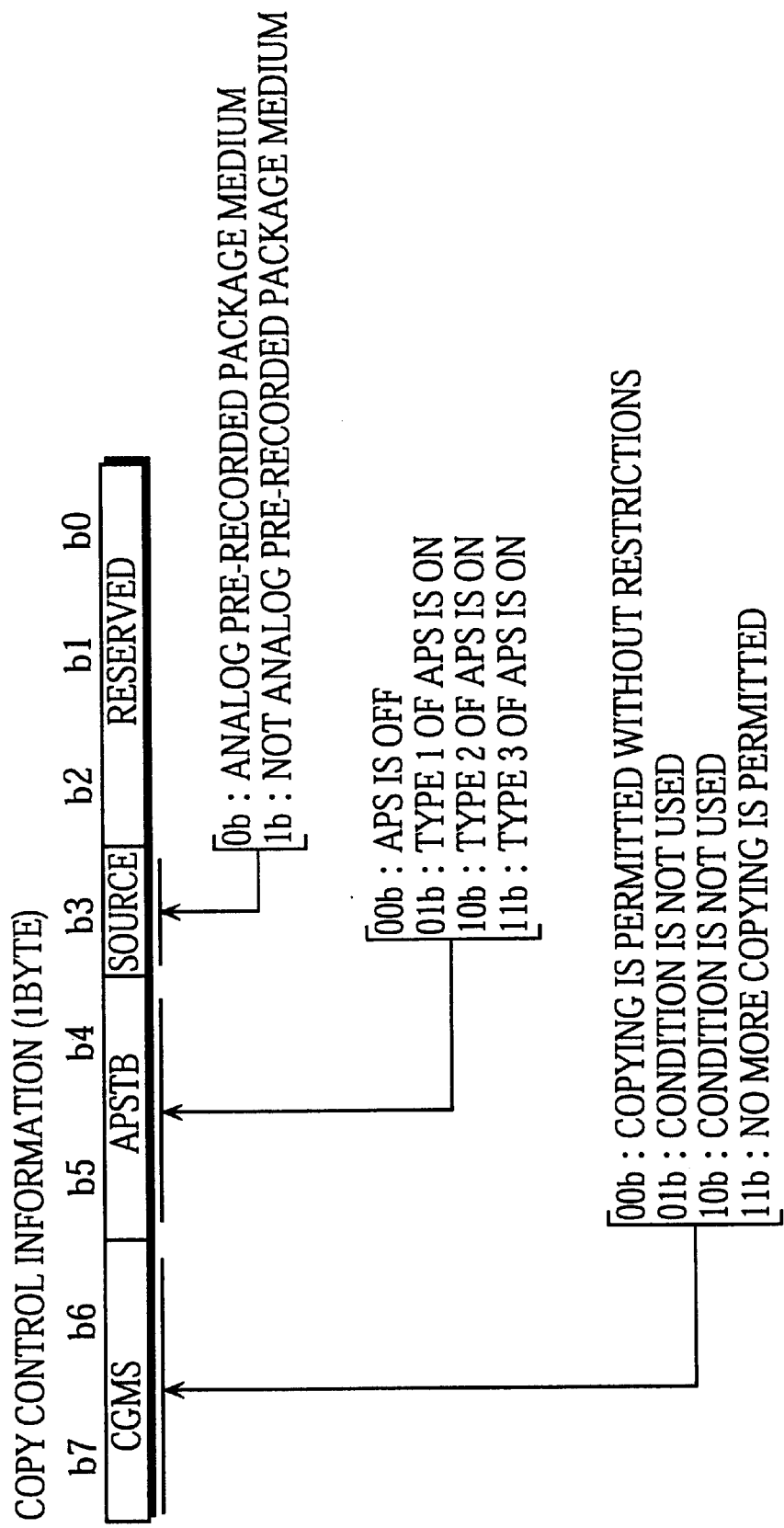
FIG. 7 shows a detailed bit configuration of copy control information (CCI) in a control pack.

FIG. 7 shows a detailed bit configuration of the CCI in a C_PCK. As shown in the figure, the CCI shows CGMS (Copy Generation Managing System), APSTB (Analog Protection System Trigger Bits), and Source.

The CGMS is shown as two bits (b7 and b6) that manage generation of copies, and is shown as one of the following values.

00b: copying is permitted without restrictions

01b: condition is not used

10b: condition is not used

11b: copying is prohibited

The optical disc recorder/player 1 receives a video signal into which information regarding the above CGMS has been multiplexed. If the received information shows that copying is prohibited, the optical disc recorder/player 1 cancels the recording. If the received information shows that a first-generation copy is permitted to be generated, the optical disc recorder/player 1 sets "11b" (showing that the copying is prohibited) as the CGMS, and performs the recording. If the information shows that the recording is permitted without restrictions, the optical disc recorder/player 1 sets "00b" (showing that the recording is permitted without restrictions) as CGMS, and performs the recording.

APS is a copy protection system developed by Macrovision Corporation for an analog video signal, and so is also called "Macrovision". The APSTB is shown as two bits (b5 and b4) to indicate an APS copy protection method used for a video signal inputted to the optical disc recorder/player 1. The settings of these two bits have the following meanings.

00b: APS is off

01b: type 1 of APS is on

10b: type 2 of APS is on

11b: type 3 of APS is on

Of the above types, type 1 is a method to disturb an AGC (automatic gain control) circuit of a VTR, and type 2 is a method that combines the above AGC disturbance method and a method to invert two colorstipes. Type 3 refers to a method that combines the above AGC disturbance method and a method to invert four colorstipes. On receiving a video signal into which information regarding the APS has been multiplexed, the optical disc recorder/player 1 sets the APSTB based on the received APS.

The Source is shown as one bit (b3) that shows whether a source material for images is an analog pre-recorded package medium as follows.

0b analog pre-recorded package medium

1b: not analog pre-recorded package medium

The Source is set by a source provider, and written in VBI data of a video signal inputted to the optical disc recorder/ player 1. The Source is defined in CEI(*Commission Electrotechnique Internationale*)/IEC6880 1998 01 Section 3 "VBID (VBI data)". The Source is set as "0b" (showing that a source material is the analog pre-recorded package medium) when a video signal inputted to the optical disc recorder/player 1 was generated from a source material such as packaged software for a movie like a laserdisc pressed at a factory. Source is set as "1b" when the inputted video signal was generated based on not the analog pre-recorded package medium but, for instance, a material generated by a broadcaster.

2.2.1.1.3 DCI CCI Status Information (DCI_CCI_SS)

Figure 8:
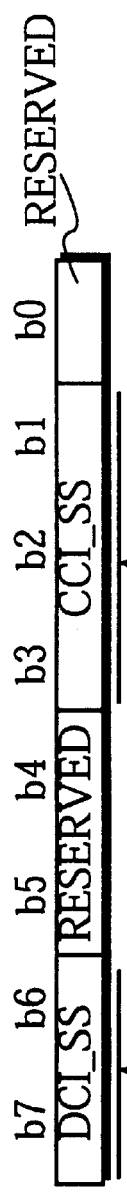
FIG. 8 shows a bit configuration of DCI CCI Status Information.

FIG. 8 shows a bit configuration of the DCI_CCI_SS contained in a C_PCK.

As shown in the figure, the DCI_CCI_SS shows DCI status (hereafter DCI_SS) and CCI status (CCI_SS).

The DCI_SS is shown as two bits that indicate which parts of the DCI are valid as follows.

00b: entire DCI is invalid

01b: only Aspect Ratio of DCI is valid

10b: reserved (undefined)

11b: Aspect Ratio, Subtitling Mode, and Film/Camera Mode in DCI are valid

Note that the value of DCI_SS may only be changed between "01b" and "11b" within a VOB.

The CCI_SS is shown as two bits that indicate which parts of the CCI are valid as follows.

000b: entire CCI is invalid

001b: Source in CCI is valid

010b: APSTB in CCI is valid

011b: APSTB and Source in CCI are valid

100b: CGMS in CCI is valid

101b: CGMS and Source in CCI are valid

110b: CGMS and APS in CCI are valid

111b: CGMS, APSTB, and Source in CCI are valid

Note: When either DCI_SS or CCI_SS is set to non-zero value, at least one of DCI and CCI is in valid state.

2.2.2 Management Information File (VR_MANGR.IFO)

Figure 9A:
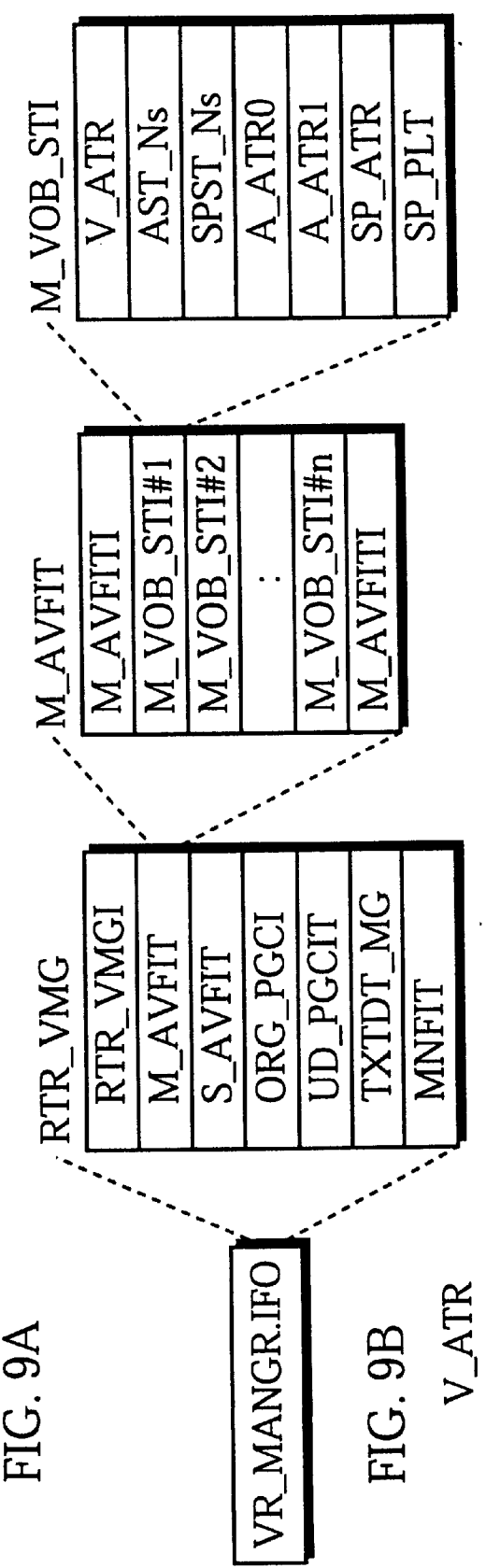
FIG. 9A shows a data construction of a VR_MANGR.IFO file shown in FIG. 2 at different levels.

FIG. 9A shows a data construction of a VR_MANGR.IFO file shown in FIG. 2 at different levels.

As shown in the figure, the VR_MANGR.IFO is also referred to as "RTR_VMG" (Real Time Recording Video Manager), and contains the following seven tables and information: RTR_VMGI (RTR_VMG Information); an M_AVFIT (Movie AV File Information Table); an S_AVFIT (Still Picture AV File Information Table); ORG_PGCI (Original Program Chain Information); a UD_PGCIT (User Defined PGC Information Table); TXTDT_MG (Test Data Manager); and an MNFIT (Manufacturer's Information Table).

The following focuses on the parts related to the "V_ATR" (Video Attribute) information that is a characteristic of the present invention.

The M_AVFIT stores management information for the VR_MOVIE.VRO (AV file for video data), and contains M_AVFITI (Movie AV File Information Table Information), M_AVFI (Movie AV File Information), and at least one set of M_VOB_STI (Movie VOB Stream Information) like M_VOB_STI#1~M_VOB_STI#n, with n being either the number of VOBs in the VR_MOVIE.VRO file or a number smaller than this number of VOBs.

Figure 9B:
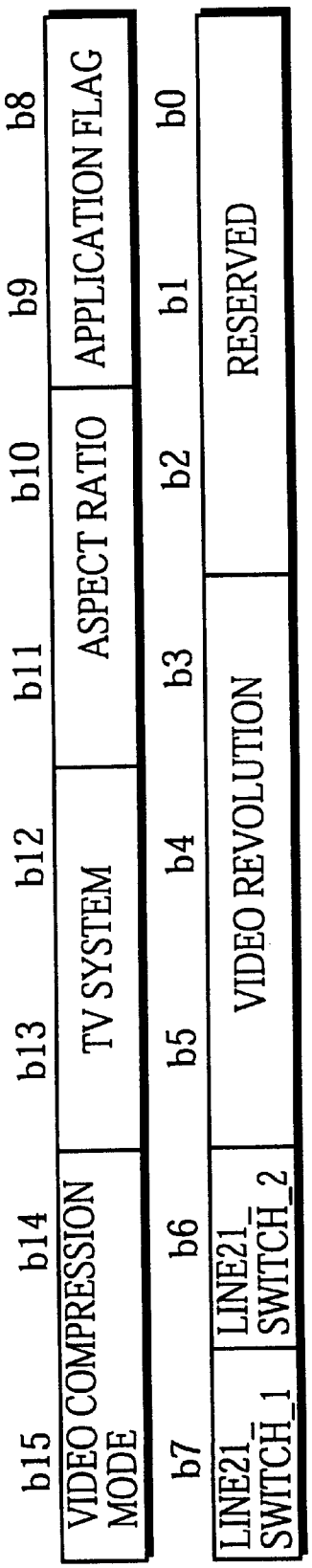
FIG. 9B shows a bit configuration of a Video Attribute (V_ATR)
Figure 9C:
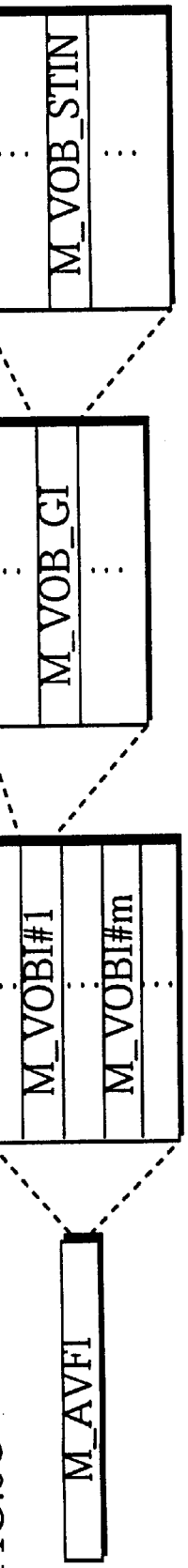
FIG. 9C shows an M_VOB_STIN (Movie_VOB_Stream Information Number) contained in M_AVFI (Movie_AV File Information.

This number "n" becomes smaller than the number of VOBs when a single set of M_VOB_STI is shared by a plurality of VOBs. This is to say, a single piece of M_VOB_STI can correspond to either one VOB or a plurality of VOBs. This correspondence between a VOB and a piece of M_VOB_STI is shown by "M_VOB_STIN" (M_VOB_STI number) that is set in VOB information (VOBI), which is contained in the M_AVFI and is given to each VOB. FIG. 9C shows the M_VOB_STIN contained in M_AVFI. The M_AVFI contains, for each VOB, a piece of VOBI (shown as "M_VOBI" in the figure) that shows information on the VOB, such as a time map and M_VOB_GI (General Information). The M_VOB_GI shows a time at which a start of the VOB was recorded, an M_VOB_STIN, or the like.

Each piece of M_VOB_STI for one or more VOBs in the VR_MOVIE.VRO file shows the following information relating to the VOBs: a V_ATR (Video Attribute); an AST_Ns (Number of Audio Streams); an SPST_Ns (Number of Sub-Picture Streams); an A_ATR0 (Audio Attribute for Stream #0); an A_ATR1 (Audio Attribute for Stream #1); an SP_ATR (Sub-Picture Attribute); and an SP_PLT (Sub-Picture Color Palette).

The V_ATR shows the attribute of images of a VOB in the VR_MOVIE.VRO file. FIG. 9B shows the bit configuration of the V_ATR. As shown in the figure, the V_ATR is composed of a Video Compression Mode, a TV System, an Aspect Ratio, an Application Flag, a Line21_Switch_1, a Line21_Switch_2, and a Video Resolution.

The Video Compression Mode is shown as two bits, with "00b" indicating that the VOB has been compressed according to MPEG 1 and "01b" indicating that the VOB has been compressed according to MPEG 2.

The TV System is shown as two bits, with "00b" indicating 525/60 (representing the number of scanning lines per frame/the number of fields per second) for the VOB and "01b" indicating 625/50. The TV system shown by the former bit set is the NTSC system, and the latter is the PAL or SECAM (Sequential Couleur a Memoire) TV system.

The Aspect Ratio is shown as two bits, with "00b" indicating a ratio 4:3 and "01b" indicating a ratio 16:9 for the VOB. When this Aspect Ratio for a VOB is interpreted, the Application Flag is used to prevent a contradiction with the Aspect Ratio for a VOBU in a C_PCK from occurring.

The Application Flag is two bit data and shows whether the aspect ratio shown in the V_ATR or in a C_PCK should be used. When the Application Flag is shown as "00b", a video stream is coded with Aspect Ratio specified in the V_ATR. In this case, the VOB does not contain any C_PCK, or the aspect ratio in a C_PCK is ignored. When the Application Flag is shown as "01b", a video stream may be coded with Aspect Ratio specified in this V_ATR, but the actual Aspect Ratio is recorded in a C_PCK if the C_PCK exists in the VOB. This is to say, the aspect ratio shown in each C_PCK is used when the two aspect ratios shown in the V_ATR and the C_PCK are different. If no C_PCK exists in a VOB, the aspect ratio shown in the V_ATR is used for images of the VOB. When a single V_ATR (a set of M_VOB_STI) corresponds to a plurality of VOBs and some of these VOBs have a C_PCK while others do not, the aspect ratio shown in a C_PCK is recognized as the aspect ratio for a VOB that contains a C_PCK, and the aspect ratio in the V_ATR is recognized for a VOB that contains no C_PCK.

Note that when DCI_SS is set as "01b" or "11b", the Application Flag in V_ATR in M_VOB_STI specified by VOBI for this M_VOB shall be set to "01b" and when DCI_SS is set to "00b", Application Flag in V_ATR in M_VOB_STI specified by VOBI for this M_VOB shall be set to "00b".

The Line21_Switch_1 is shown as one bit, with "1b" indicating that the VOB contains data (which is often closed caption data) that has been multiplexed into the 21st horizontal scanning line in the first field of a frame, with "0b" indicating that the VOB contains no such data.

The Line21_Switch_2 is the same as the Line21_Switch_1 except that the former is provided corresponding to the second field of a frame.

The Video Resolution is shown as three bits that indicate the resolution of images for the VOB. For the VOB conforming to the above TV system of "525/60", when the three bits are "000b", "001b", "010b", "011b", "100b", and "101b", the resolution for the VOB is 720×480, 704×480, 352×480, 352×240, 544×480, and 480×480, respectively. For the VOB conforming to the above TV system with "625/50", when the three bits are "000b", "001b", "010b", "011b", "100b", and "101b", the resolution for the VOB is 720×570, 704×576, 352×576, 352×288, 544×576, and 480×576, respectively.

As the V_ATR is contained in the VR_MANGR.IFO file provided separately from the AV files, the optical disc recorder/player 1 can read the attribute of each VOB without reproducing the AV files. In this way, the attribute for each VOB is set in the V_ATR, and the attribute for each VOBU is set in a C_PCK.

3. Construction of Optical Disc Recorder/Player 1

Figure 10:
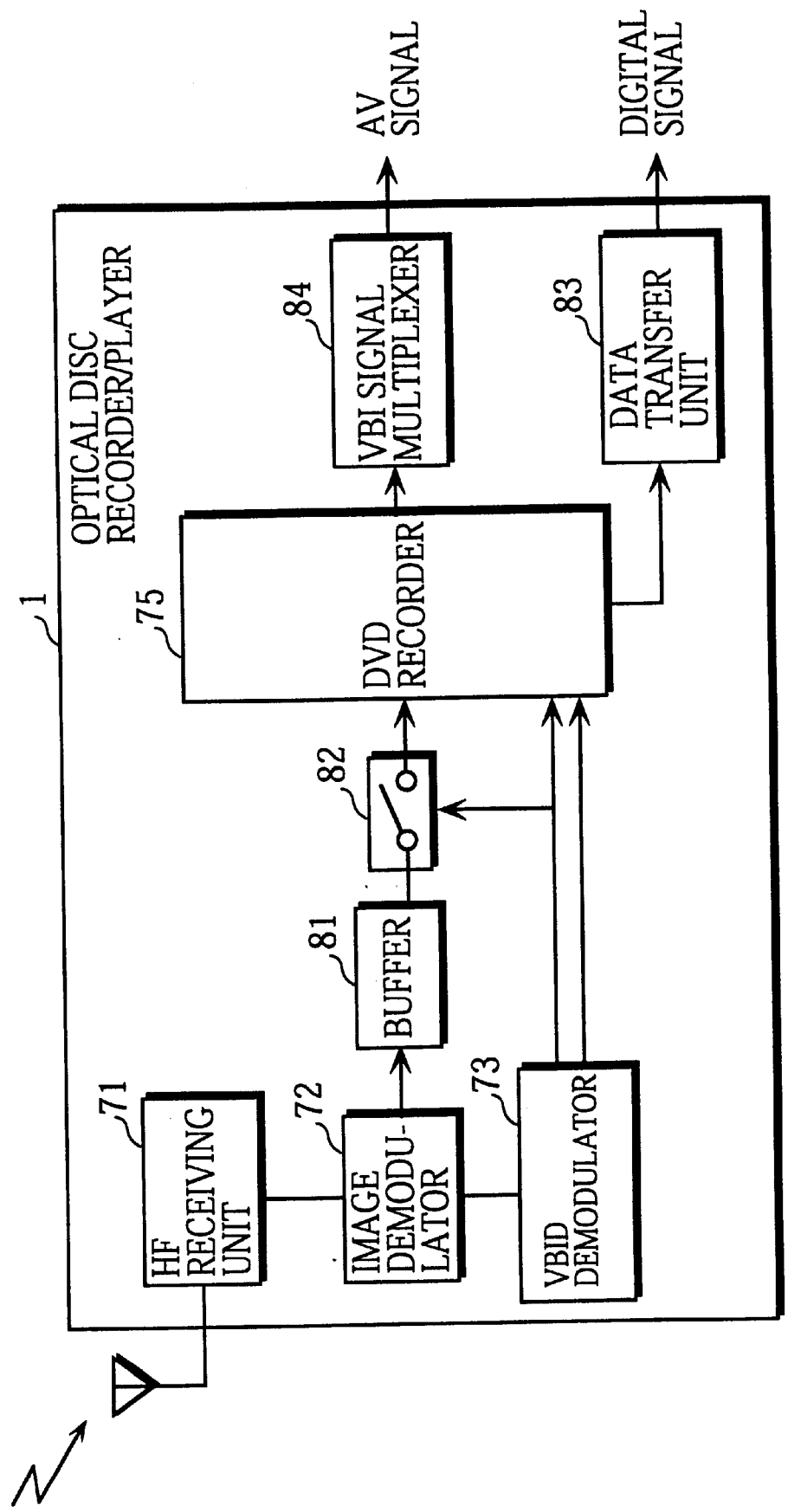
FIG. 10 is a block diagram showing a detailed construction of an optical disc recorder/player in FIG. 1.

FIG. 10 is a block diagram showing the construction of the optical disc recorder/player 1. As shown in the figure, the optical disc recorder/player 1 comprises the following elements: a high frequency (HF) receiving unit 71; an image demodulator 72; a VBID (VBI data) demodulator 73; a buffer 81; a switch 82; a DVD recorder 75; a data transfer unit 83; and a VBI signal multiplexer 84.

The HF receiving unit 71 receives a desired TV signal via a broadcast wave.

The image demodulator 72 demodulates the TV signal received by the HF receiving unit 71, converts the demodulated TV signal into a video signal and an audio signal, and outputs them via the buffer 81 and the switch 82 to the DVD recorder 75.

The VBID demodulator 73 detects VBID contained in the video signal that has been demodulated by the image demodulator 72, generates DCI data, CCI data, and DCI_CCI_SS data based on the detected VBID, and outputs them to the DVD recorder 75. A time lag between the output of the video signal and the audio signal by the image demodulator 72, and the output of the DCI data, CCI data, and the DCI_CCI_SS data by the VBID demodulator 73 is absorbed by the buffer 81 and the switch 82 so as to have the video signal, the audio signal, the DCI data, the CCI data, and the DCI_CCI_SS data inputted synchronously to the DVD recorder 75.

The DVD recorder 75 receives the video signal and audio signal via the buffer 81 and the switch 82 from the image demodulator 72, compresses them as VOBs, and records the VOBs onto a DVD-RAM. When doing so, the DVD recorder 75 receives the DCI data, CCI data, DCI_CCI_SS data from the VBID demodulator 73, and records DCI, CCI, and DCI_CCI_SS for each VOBU onto the DVD-RAM. The DVD recorder 75 also decodes a VOB on a DVD-RAM to obtain an analog AV signal which it outputs to the VBI signal multiplexer 84. While outputting this analog signal, the DVD recorder 75 extracts DCI and CCI from VOBUs, and outputs them to the VBI signal multiplexer 84.

The VBI signal multiplexer 84 receives the analog video signal, the DCI, and the CCI from the DVD recorder 75, and multiplexes VBID that is based on the received DCI and CCI into the analog video signal during a VBI.

The data transfer unit 83 receives a digital AV signal that has been decoded by the DVD recorder 75, and outputs it to a device, such as a PC (personal computer). The data transfer unit 83 determines whether to perform the outputting based on the CCI that has been inputted from the DVD recorder 75.

3.1 VBID Demodulator

Figure 11:
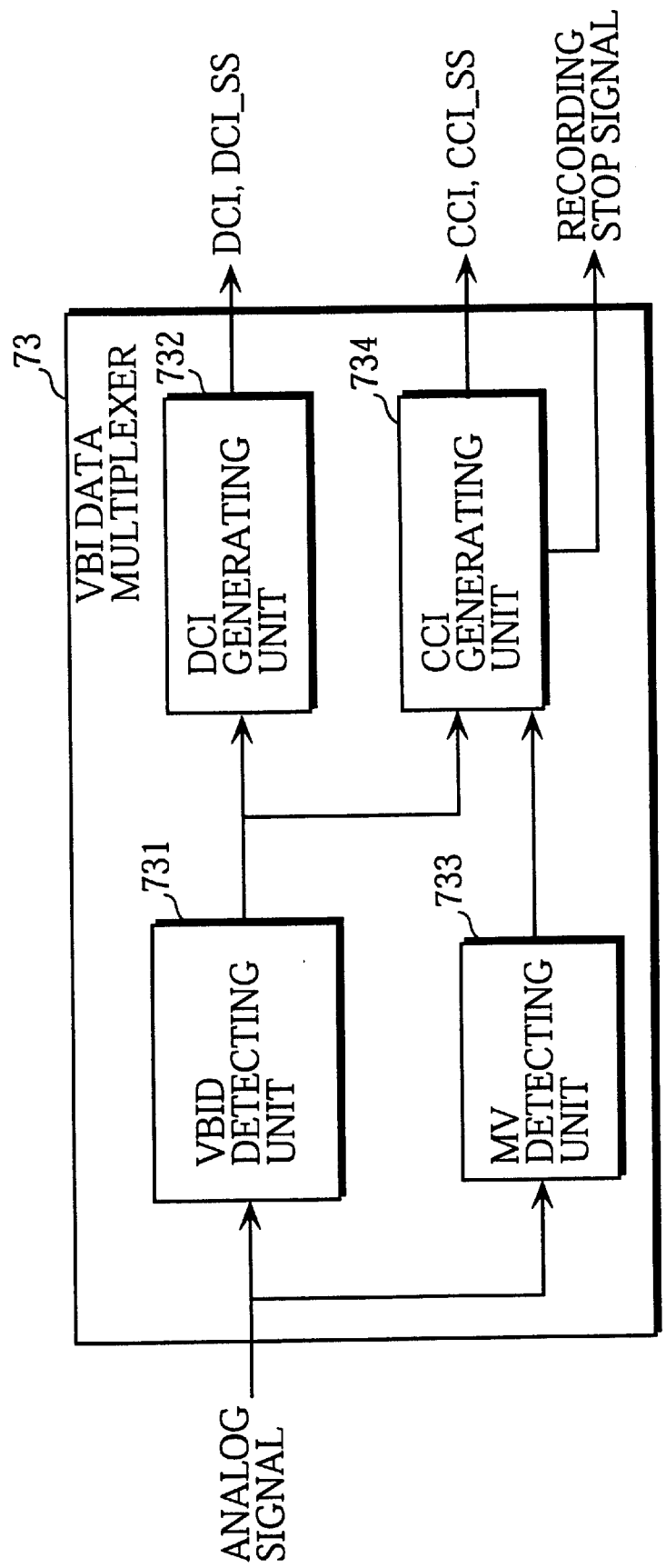
FIG. 11 is a block diagram showing a detailed construction of a VBID demodulator.

FIG. 11 is a block diagram showing the detailed construction of the VBID demodulator 73, which comprises the following elements: a VBID detecting unit 731, a DCI generating unit 732, an MV (Macrovision) detecting unit 733, and a CCI generating unit 734.

The VBID detecting unit 731 receives an analog video signal from the image demodulator 72, and detects VBID contained in each field of the analog video signal. The following explanation assumes that 20-bit VBID is multiplexed into the 20th and 278th horizontal scanning lines of an NTSC analog video signal and that 13-bit VBID is multiplexed into the 23rd horizontal scanning line of a PALplus analog video signal. The above 20-bit VBID contains the following bits: two bits (b1 and b2) showing Aspect Ratio or letterbox control information; two bits (b7 and b5) showing CGMS; two bits (b9 and b10) showing APSTB; and one bit (b11) showing whether a source medium for an image for the field is the analog pre-recorded medium. On the other hand, the above 13-bit VBID contains the following bits: four bits (b0 to b3) showing Aspect Ratio or letterbox control information; one bit (b4) showing the Film/Camera Mode; and two bits (b9 and b10) showing the Subtitling Mode. The VBID detecting unit 731 detects the above 20-bit VBID from an NTSC signal, and the 13-bit VBID from a PAL signal.

The MV detecting unit 733 detects whether Macrovision is used as a copy protection method for the analog video signal which has been inputted from the image demodulator 72.

3.1.1 DCI Generating Unit

The DCI generating unit 732 includes a one-byte internal DCI register and a two-bit internal DCI_SS register. After generating data for DCI and DCI_SS based on the detected VBID, the DCI generating unit 732 sets the DCI data and DCI_SS data in the above two registers, which then output the stored data to the DVD recorder 75.

Figure 12:
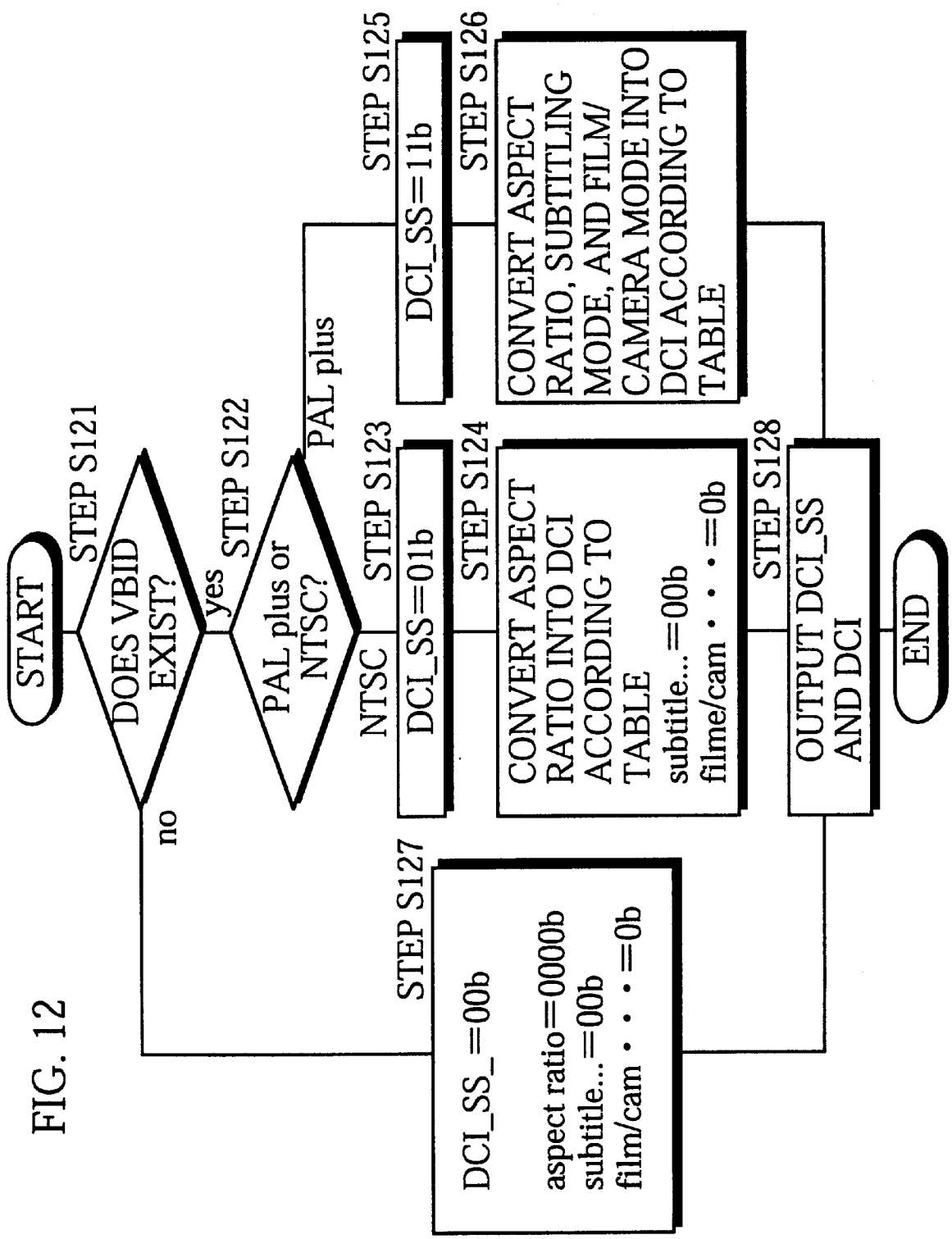
FIG. 12 is a flowchart showing the processing by the DCI generating unit to generate DCI.

FIG. 12 is a flowchart showing the detailed processing by the DCI generating unit 732 to generate the DCI data and DCI_SS data. The DCI generating unit 732 judges whether the VBID detecting unit 731 has detected VBID (step 121). If VBID has been detected and the current analog video signal is an NTSC signal (step 122), the DCI generating unit 732 sets "01b" in the DCI_SS register (step 123). This is because the NTSC signal contains VBID of which only the Aspect Ratio can be set as valid DCI.

Following this, the DCI generating unit 732 converts the two bits (b1 and b2) of the 20-bit VBID, which has been detected by the VBID detecting unit 731, according to a conversion table shown in FIG. 13. As a result, the two bits are converted into four bits. The DCI generating unit 732 then sets the four bits in b4–b7 of the DCI register as the Aspect Ratio, and "0" in the remaining bits of the DCI register as the Subtitling Mode and the Film/Camera Mode (Step 124). The DCI generating unit 732 sets "00b" in the DCI_SS register if the above two bits (b1 and b2) are "11b".

On the other hand, when judging in step 122 that the analog video signal is a PAL signal, the DCI generating unit 732 sets "11b" in the DCI_SS register (step 125) because the PAL signal contains VBID of which the Aspect Ratio, the Subtitling Mode, and the Film/Camera Mode can be set as valid DCI.

Following this, the DCI generating unit 732 converts four bits (b0 to b3 for the Aspect Ratio), two bits (b9 and b10 for the Subtitling Mode), and one bit (b4 for the Film/Camera Mode) of the 13-bit VBID, according to conversion tables shown in FIGS. 14–16. The DCI generating unit 732 then sets the converted bits in the DCI register as the Aspect Ratio, the Subtitling Mode, and the Film/Camera Mode (step 126).

When the VBID detecting unit 731 has not detected any VBID (step S121), the DCI generating unit 732 sets "0" in all the bits of the DCI register and the DCI_SS register (step 127).

After setting data in the DCI register and the DCI_SS register in this way, the DCI generating unit 732 outputs all the data to the DVD recorder 75.

3.1.2 CCI Generating Unit

The CCI generating unit 734 includes a one-byte internal CCI register and a three-bit internal CCI_SS register, and generates CCI data and CCI_SS data based on the VBID that has been detected by the VBID detecting unit 731 and on a detection result generated by the MV detecting unit 733. The CCI generating unit 734 then sets the generated CCI data and CCI_SS data in the above two registers, and outputs the data in the registers to the DVD recorder 75.

Figure 17:
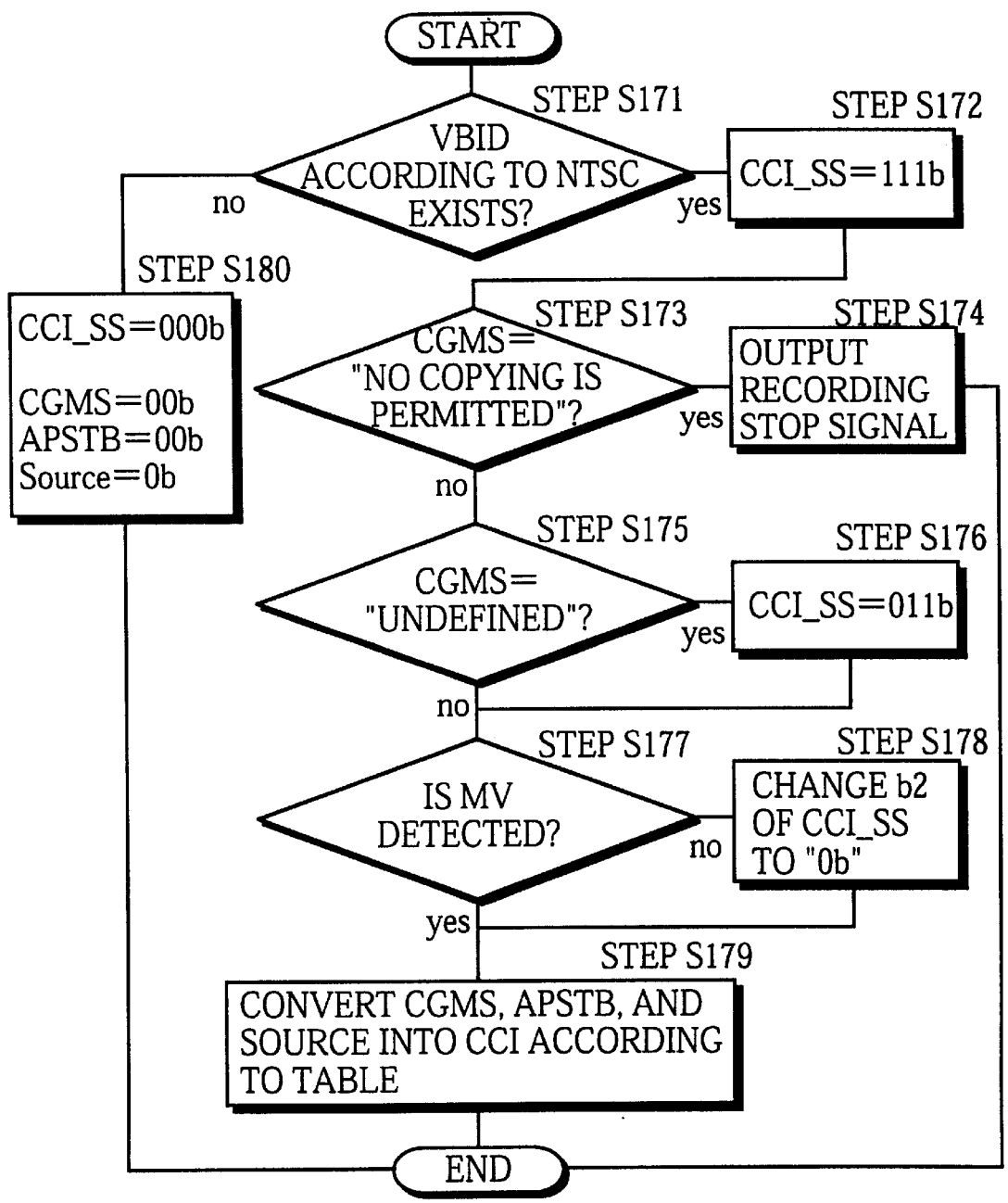
FIG. 17 is a flowchart showing the detailed processing by the CCI generating unit.

FIG. 17 is a flowchart showing the detailed processing by the CCI generating unit 734 to generate the CCI data and CCI_SS data. On judging that an analog video signal inputted from the image demodulator 72 is an NTSC signal and that the VBID detecting unit 731 has detected the VBID (step 171), the CCI generating unit 734 sets "111b" in the CCI_SS register (step 172). These bits can be updated through the following processing. When judging that two bits (b7 and bB) of the 20-bit VBID that has been detected by the VBID detecting unit 731 are "11b" (indicating that copying is prohibited) (step S173), the CCI generating unit 734 outputs a recoding stop signal to the switch 82 and the DVD recorder 75 (step 174) so that the switch 82 becomes OFF and the analog video signal is not outputted to the DVD recorder 75. As a result, the DVD recorder 75 stops the processing that records data for the DVD-RAM. Thereafter, when receiving VBID that does not prohibit copying, the CCI generating unit 734 clears the recording prohibition, clears the stored data in the buffer 81, sets the switch 82 on, and resumes the recording processing.

After giving the "NO" judgement in step S173, the CCI generating unit 734 further judges if the above two bits (b7 and b8) of the 20-bit VBID are "01b" (indicating that the CGMS is undefined) (step S175). If so, the CCI generating unit 734 sets "011b" in the CCI SS register (step 176). When the MV detecting unit 733 has judged that Macrovision is not used for the video signal (step 177), the CCI generating unit 734 changes the bit (b2) in the CCI_SS register to "0" (step S178).

After this, the CCI generating unit 734 converts sets of bits (b7–b8, b9–b10, and b11) into the CGMS, the APSTB, and the Source using conversion tables shown in FIGS. 18–20 (step 179), and sets them in the CCI register.

On the other hand, when the video signal from the image demodulator 72 is not an NTSC signal and the VBID detecting unit 731 has not detected any VBID from the signal (step 171), the CCI generating unit 734 sets "0" in the all the bits of the CCI register and the CCI_SS register (step 180) since no CCI information exists for the video signal.

After performing the above operations for a field of the video signal sent by the image demodulator 72, the CCI generating unit 734 and the DCI generating unit 732 output the data stored in the CCI register, the DCI register, the CCI_SS register, and the DCI_SS register to the DVD recorder 75. Hereafter, data outputted from the CCI register and DCI register are called CCI data and DCI data, respectively, and data outputted from the DCI_SS register and the CCI_SS register are collectively called DCI_CCI_SS data.

3.2 DVD Recorder

Figure 21:
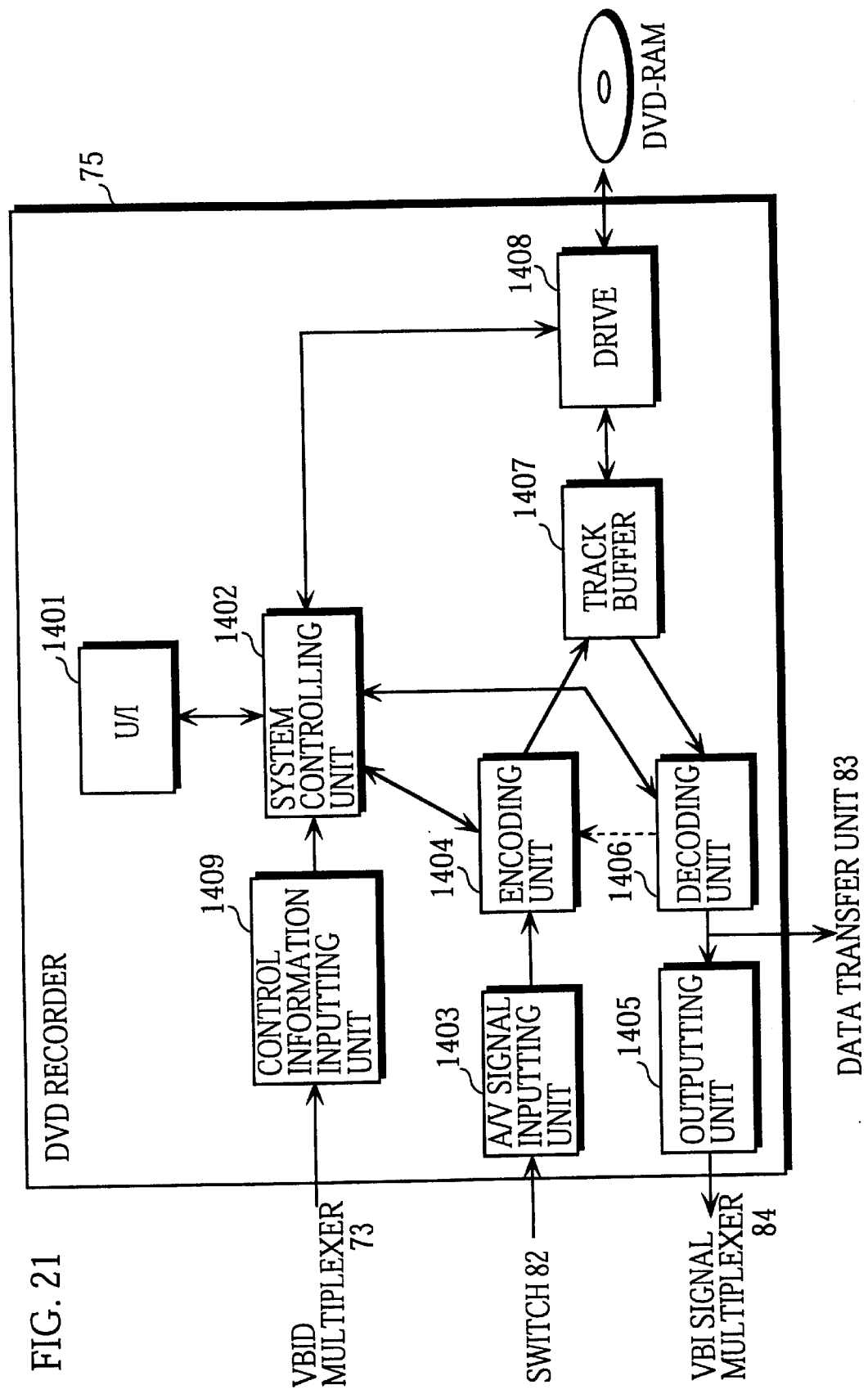
FIG. 21 is a block diagram showing a detailed construction of a DVD recorder.

FIG. 21 is a block diagram showing the detailed construction of the DVD recorder 75, which includes the following elements: a user interface (U/I) unit 1401; a system controlling unit 1402; an A/V signal inputting unit 1403; an encoding unit 1404; an outputting unit 1405; a decoding unit 1406; a track buffer 1407; a drive 1408; and a control information inputting unit 1409.

The U/I unit 1401 includes an operation panel and a remote control signal photoreceiver, and receives a user operation via the operation panel and a remote control signal via the photoreceiver from a remote controller as shown in FIG. 1.

The system controlling unit 1402 receives an instruction from the U/I unit 1401 such as a recording start instruction, a recording end instruction, a playback start instruction, or a playback end instruction, and controls the overall processing in accordance with the received instruction. When the recording is performed, the system controlling unit 1402 receives the DCI data, CCI data, and the DCI_CCI_SS data (hereafter these three sets of data are collectively called "control information data") that corresponds to one field from the control information inputting unit 1409, and determines contents of control information that should be inserted into a C_PCK at a start of a VOBU, and outputs the control information to the encoding unit 1404. This is to say, the system controlling unit 1402 receives the control information data that corresponds to at least one field (i.e., 1/60 or 1/50 second), and outputs control information corresponding to a VOBU (i.e., 0.4–1.0 second) to the encoding unit 1404. A field that corresponds to VBID whose content is different from VBID of a preceding field is not necessarily located at a start of a VOBU. The system controlling unit 1402 detects changes in the control information data, which is inputted for each field, during a predetermined period for which fields in front of and behind fields corresponding to a start of a current VOBU are inputted, and has the most suitable control information inserted at the start of the current VOBU.

The A/V signal inputting unit 1403 receives a video signal and an audio signal via the buffer 81 and the switch 82 from the image demodulator 72, and outputs them to the encoding unit 1404.

The encoding unit 1404 generates a V_PCK and an A_PCK by compressing the video signal and audio signal inputted from the A/V signal inputting unit 1403, and generates a C_PCK based on the control information inputted from the system controlling unit 1402. The encoding unit 1404 then generates a VOB made up of VOBUs that each have a C_PCK at a start. The above operations are performed under the control of the system controlling unit 1402.

The track buffer 1407 temporarily stores a VOB generated by the encoding unit 1404 when recording is to be performed, and stores a VOB read from the DVD-RAM when playback is to be performed.

When a DVD-RAM is loaded and playback or recording is performed, the drive 1408 performs the servo control and the roll control when the recording or the playing is performed. The drive 1403 writes a VOB stored in the track buffer 1407 onto the DVD-RAM via an optical pickup, and reads a VOB from the DVD-RAM into the track buffer 1407 via the optical pickup. In reality, however, a write onto and a read from the DVD-RAM are performed in a unit of an ECC (Error Correcting Code) block (i.e., sixteen sectors that are equal to 2 KB×16 packs). This is not related to the essence of present invention and so will not be described.

The decoding unit 1406 receives a VOB that has been read from the DVD-RAM and sent from the track buffer 1407, decompresses the VOB to obtain a digital video signal and a digital audio signal. At the same time, the decoding unit 1406 extracts control information from the C_PCK in the VOB, and outputs it via the outputting unit 1405 to the VBI signal multiplexer 84. The decoding unit 1406 performs the above operations under the control of the system controlling unit 1402.

The outputting unit 1405 converts the digital video signal and audio signal into analog forms, and output them to the VBI signal multiplexer 84. The outputting unit 1405 also receives the control information from the decoding unit 1406, and outputs it to the VBI signal multiplexer 84.

The control information inputting unit 1409 receives the control information data from the VBID demodulator 73 and outputs it to the system controlling unit 1402.

3.2.1 Encoding Unit

Figure 22:
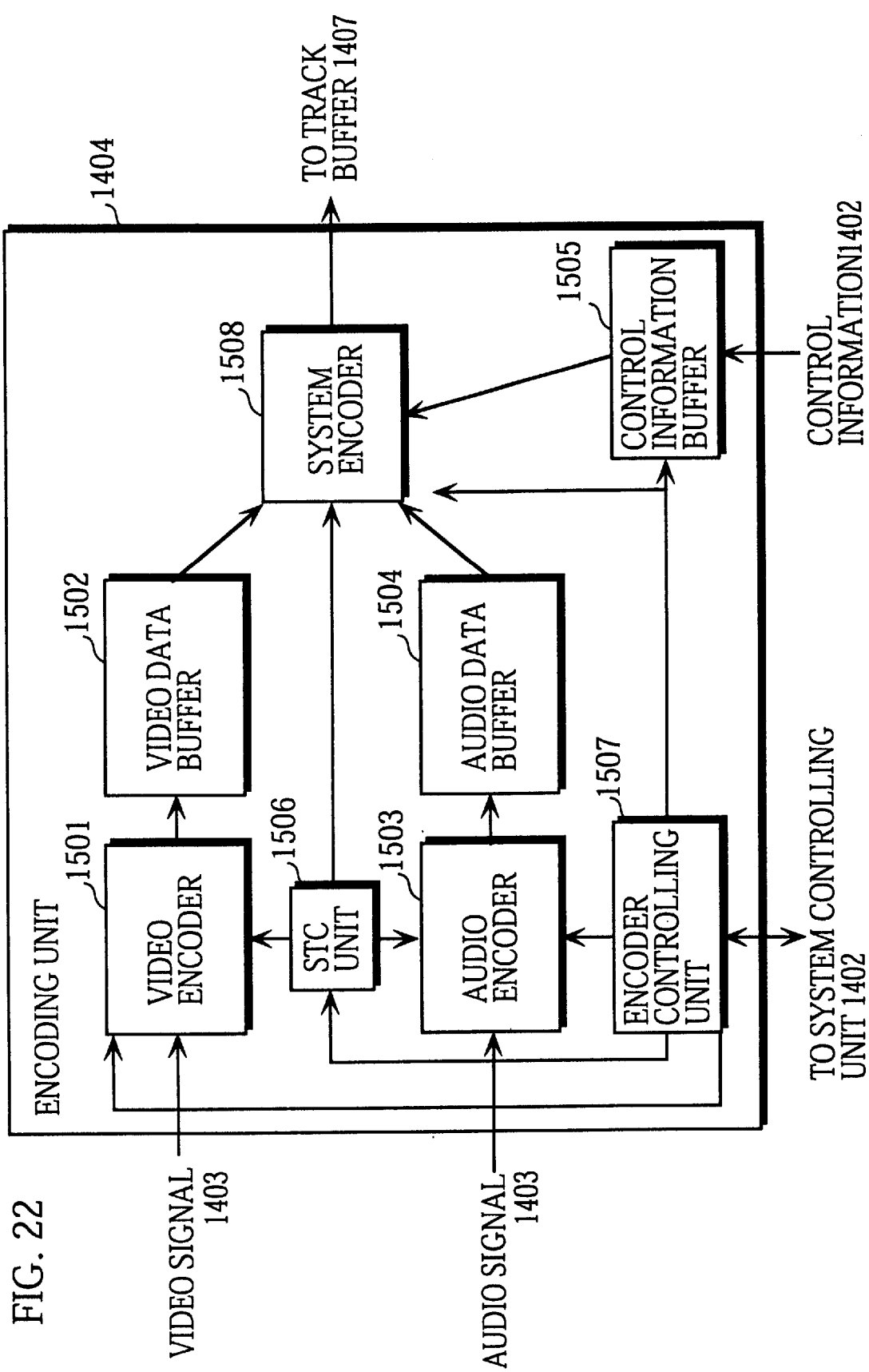
FIG. 22 is a block diagram showing a detailed construction of an encoding unit.

FIG. 22 is a block diagram showing the detailed construction of the encoding unit 1404 shown in FIG. 21. The encoding unit 1404 contains the following elements: a video encoder 1501; a video data buffer 1502; an audio encoder 1503; an audio data buffer 1504; a control information buffer 1505; a system time clock (STC) unit 1506; an encoder controlling unit 1507; and a system encoder 1508.

The video encoder 1501 receives a video signal from the A/V signal inputting unit 1403, compresses (encodes) the video signal into MPEG2 video data, and places the MPEG2 video data into the video data buffer 1502.

The audio encoder 1503 receives an audio signal from the A/V signal inputting unit 1403, compresses (encodes) the audio signal, and places the compressed audio data into the audio data buffer 1504.

The control information buffer 1505 temporarily stores the control information inputted from the system controlling unit 1402.

The STC unit 1506 generates a clock signal (a system time clock) according to which the encoding is performed.

The encoder controlling unit 1507 controls the overall encoding operations of the encoding unit 1404. According to an encoding start instruction and an encoding end instruction from the system controlling unit 1402, the encoder controlling unit 1507 starts and ends the encoding, and informs the system controlling unit 1402 of the end of the encoding whenever one VOBU has been generated. When receiving an instruction to insert control information into a start of a VOBU from the system controlling unit 1402, the encoder controlling unit 1507 has the control information buffer 1505 output control information to the system encoder 1508.

The system encoder 1508 extracts compressed video data and compressed audio data that have the same size as the payload of a pack (or a packet), and control information from the video data buffer 1502, the audio data buffer 1504, and the control information buffer 1505, respectively. The system encoder 1508 then generates a C_PCK, a V_PCK, and an A_PCK, produces a VOBU by interleaving generated packs, and outputs the generated VOBU to the track buffer 1407.

3.2.1.1 System Encoder

Figure 23:
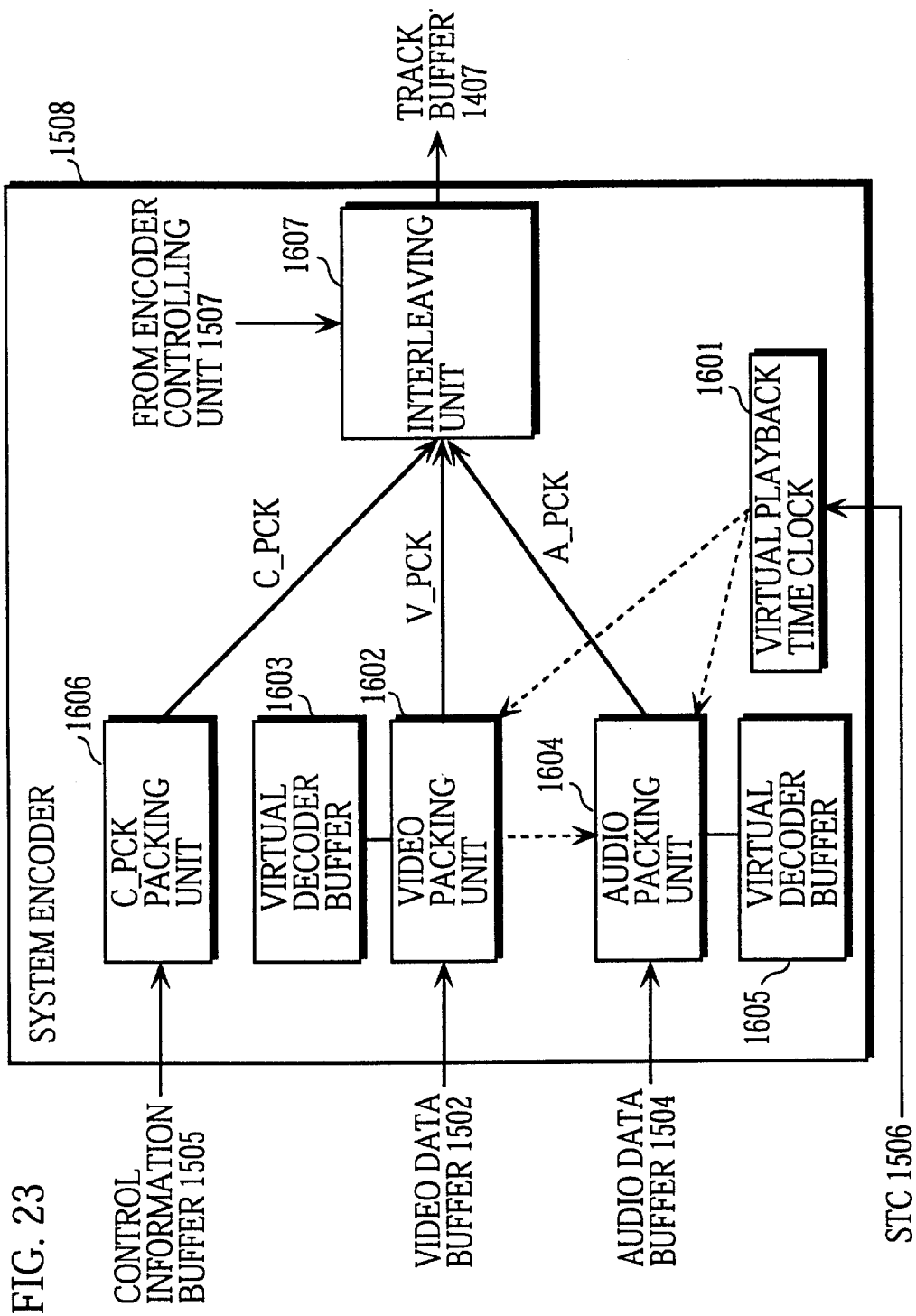
FIG. 23 is a block diagram showing a detailed construction of a system encoder.

FIG. 23 is a block diagram showing the detailed construction of the system encoder 1508. As shown in the figure, the system encoder 1508 contains a virtual playback time clock unit 1601, a video packing unit 1602, virtual decoder buffers 1603 and 1605, an audio packing unit 1604, a C_PCK packing unit 1606, and an interleaving unit 1607.

The virtual playback time clock unit 1601 generates a virtual playback time based on which time stamps, such as an SCR, a DTS (Decode Time Stamp), and a PTS (Presentation Time Stamp), are given to each pack. Here, the DTS shows a time at which the decoding unit 1406 should start decoding a pack during playback, and the PTS shows a time at which video data or audio data that has been decoded from the pack should be presented to the user when playback is performed.

The video packing unit 1602 extracts compressed video data from the video data buffer 1502, and generates a V_PCK containing the extracted video data. When doing so, time stamps are set so as to avoid underflows and overflows in the virtual decoder buffer 1603.

The virtual decoder buffer 1603 is a virtual buffer used in simulation of how much video data will accumulate in a buffer used as a temporary storage during playback.

The audio packing unit 1604 extracts compressed audio data from the audio data buffer 1504, and generates an A_PCK containing the extracted audio data. When doing so, time stamps are set so as to avoid underflows and overflows in the virtual decoder buffer 1605.

The virtual decoder buffer 1605 is a virtual buffer used in simulation of how much audio data will accumulate in a buffer used as a temporary storage during playback.

The C_PCK packing unit 1606 generates a C_PCK as shown in FIG. 4 for each VOBU using control information (i.e., DCI, CCI, and DCI_CCI_SS) inputted from the control information buffer 1505, and assigns the C_PCK an SCR with the lowest value of all the packs that will make up the VOBU.

The interleaving unit 1607 extracts packs one by one in ascending order of SCR out of the packs that have been generated by the C_PCK packing unit 1606, the video packing unit 1602, and the audio packing unit 1604, produces a pack sequence, that is, a VOBU by arranging the above packs in order of the above extraction, and outputs the generated VOBU to the track buffer 1407. Note that a C_PCK is given an SCR with the lowest value of all the packs that make up a VOBU. As a result, a C_PCK is always placed at a start of a VOBU.

3.2.1.2 Encoding Control Flow

Figure 24:
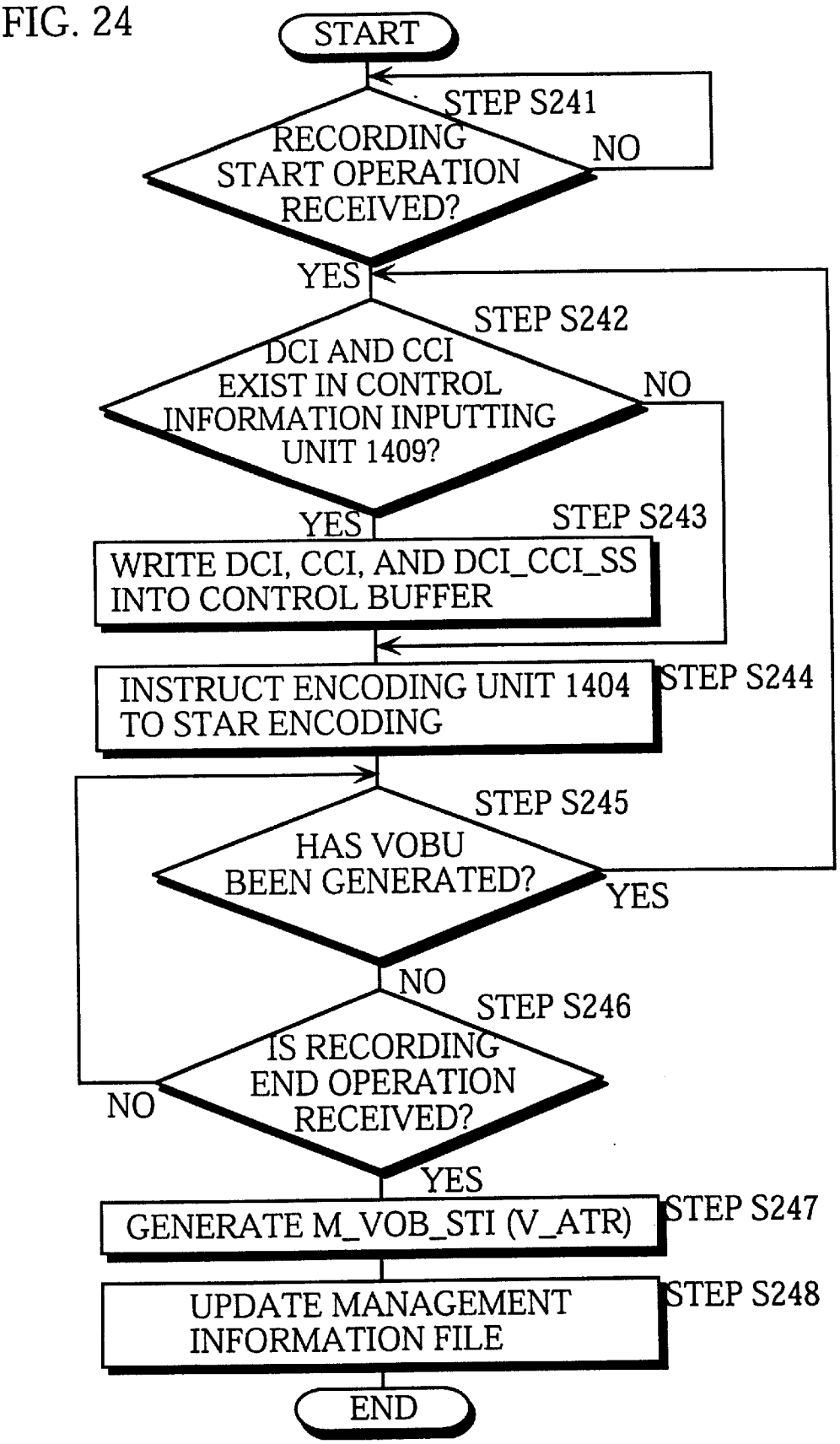
FIG. 24 is a flowchart showing the processing by a system controlling unit to control the encoding.

FIG. 24 is a flowchart showing the encoding control by the system controlling unit 1409 shown in FIG. 21.

The system controlling unit 1402 receives, from the U/I unit 1401, a notification showing that the U/I unit 1401 has received a recording start instruction (step S241). The system controlling unit 1402 then judges if it has received valid control information from the controlling information inputting unit 1409 (i.e., the unit 1402 judges if all the bits of at least one of the DCI_SS data and the CCI_SS data are not "0") (step S242). If so, the system controlling unit 1402 examines how the received control information data for a plurality of fields to be contained in a VOBU changes, determines the content of control information suited to be placed at a start of the VOBU, and writes the control information into the control information buffer 1505 (step S243). For instance, when there is no change in control information data for five fields that proceed a picture (i.e., field) to be placed at a start of the VOBU, the system controlling unit 1402 writes this control information data as control information into the control information buffer 1505.

Note that in this step S243 the system controlling unit 1402 may simply write control information for fields that correspond to a start of a VOBU into the control information buffer 1505 without examining the changes in the control information. This can reduce the operation load of the system controlling unit 1402.

The encoding unit 1404 places a C_PCK that contains this control information at a start of the VOBU.

The system controlling unit 1402 instructs the encoding unit 1404 (the encoder controlling unit 1507 to be exact) to start the encoding (step S244), and at the same time controls the drive 1408 to have it record the result of the encoding onto the DVD-RAM.

Following this, the system controlling unit 1402 judges if it has received from the encoder controlling unit 1507 a notification showing that the encoding has been completed for a VOBU (step S245), and further judges if it has received from the U/I unit 1401 a notification showing that the U/I unit 1401 has received a recording end instruction (step S246).

When the encoding for the VOBU has been completed (step S245), the system controlling unit 1402 controls to start the encoding for the next VOBU by performing the operations from steps S242–S244. As a result, the next VOBU containing a C_PCK at a start of the VOBU is generated.

If a recording end instruction has been received (step S246), the system controlling unit 1402 instructs the encoding unit 1404 to stop the encoding, and generates M VOB STI for VOBs that have been recorded on the DVD-RAM (step S247). In generating the M_VOB_STI, the system controlling unit 1402 sets the Application Flag in the M_VOB_STI as "01b" (showing that images of the current VOB have the aspect ratio shown in each C_PCK) if the Aspect Ratio shown in a plurality of C_PCKs contained in the current VOB changes. When the aspect ratio remains the same within the VOB, the system controlling unit 1402 sets the Application Flag as "00b" (showing that images of the current VOB have the same aspect ratio shown in the V_ATR). When setting "00b" as the Application Flag, the system controlling unit 1402 sets an aspect ratio that has been inputted from the control inputting unit 1409 in the Aspect Ratio in the V_ATR. When setting "01b" as the Application Flag, the system controlling unit 1409 selects a suitable aspect ratio from aspect ratios that have been inputted from the control information inputting unit 1409, and sets the selected aspect ratio as the Aspect Ratio in the V_ATR. The "suitable" aspect ratio may be an aspect ratio used when the recording starts or an aspect ratio that has been used most frequently during the recording.

Following this, the system controlling unit 1402 updates or generates a VR_MANGR.IFO management information file to insert the generated M_VOB_STI into the VR_MANGR.IFO (step S248).

In this way, the system controlling unit 1402 generates a VOBU in which a C_PCK containing control information is placed at a start of the C_PCK, and updates the VR_MANGR.IFO containing a V_ATR.

On the other hand, when the system controlling unit 1402 has judged that it has not received any valid control information data in step S242, the unit 1402 skips the processing in step S243 and performs the processing in step S244. As a result, the encoding unit 1404 generates a VOBU without inserting a C_PCK into a start of the VOBU. In the present embodiment, the encoding unit 1404 does not insert a C_PCK into any of the VOBUs that make up a VOB if no C_PCK is inserted into a VOBU at the start of the VOB.

3.2.2 Decoding Unit

Figure 25:
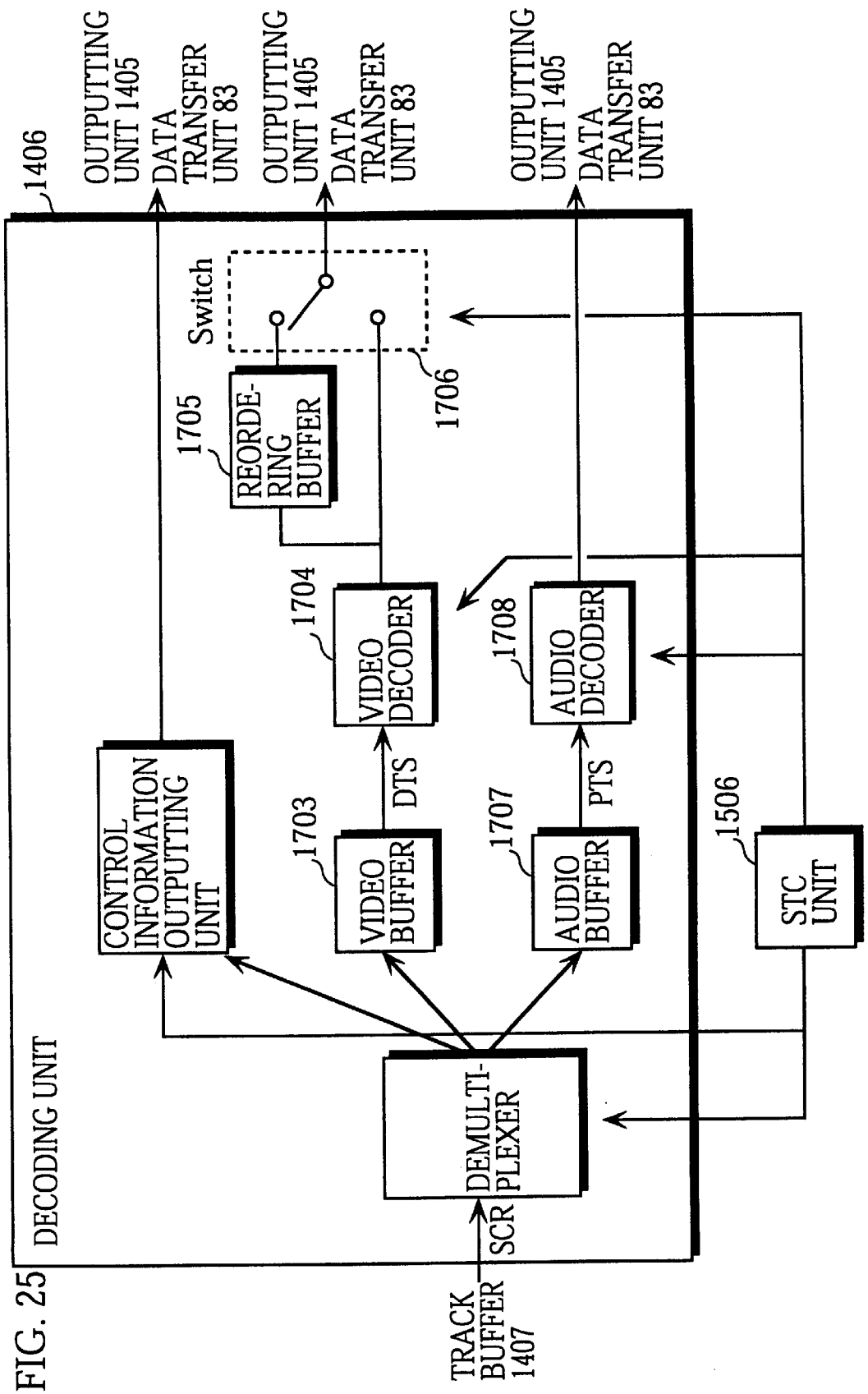
FIG. 25 is a block diagram showing a detailed construction of a decoding unit.

FIG. 25 is a block diagram showing the detailed construction of the decoding unit 1406 shown in FIG. 21. As shown in the figure, the decoding unit 1405 includes a demultiplexer 1702, a video buffer 1703, a video decoder 1704, a reordering buffer 1705, a switch 1706, an audio buffer 1707, an audio decoder 1708, and a control information outputting unit 1709.

When playback is to be performed, the demultiplexer 1702 receives a VOB from the tack buffer 1407, and places the payload (i.e., packet) of each pack making up the VOB into the control information outputting unit 1709, the video buffer 1703, or the audio buffer 1707 in accordance with a type of the pack.

The video decoder 1704 extracts a packet from the video buffer 1703 and decodes the extracted packet. The above extraction is performed when a DTS written in a packet stored at a start of the video buffer 1703 is equal to the STC.

The reordering buffer 1705 buffers a plurality of sets of decoded video data and is used when the plurality of sets of the video data are rearranged to change the decoding order of the video data into the displaying order for pictures.

The switch 1706 receives the decoded video data from the video decoder 1704 and the reordering buffer 1705, and outputs video data that corresponds to one picture to the outputting unit 1405 and the data transfer unit 83. This output is performed when a PTS written in a packet is equal to the STC.

The audio decoder 1708 extracts a packet from the audio buffer 1707, and decodes the extracted packet. This extraction is performed when a PTS written in a packet stored at a start of the audio buffer 1707 is equal to the STC. The audio decoder outputs the result of this decoding to the outputting unit 1405 and the data transfer unit 83 immediately after the decoding.

The control information outputting unit 1709 receives a packet of a C_PCK from the demultiplexer 1702, and outputs control information (i.e., DCI, CCI, and DCI_CCI_SS) in the received packet to the outputting unit 1405 and the data transfer unit 83. Since a C_PCK is present at a start of each VOBU, the control information outputting unit 1709 outputs control information to the outputting unit 1405 whenever one VOBU has been decoded.

This control information is outputted via the outputting unit 1405 to the VBI signal multiplexer 84. On receiving the control information and an analog video signal from the outputting unit 1405, the VBI signal multiplexer 84 multiplexes VBID into the analog video signal during a VBI based on the control information. More specifically, the VBI signal multiplexer 84 receives the control information corresponding to one VOBU, and holds the control information until it receives the next control information. The VBI signal multiplexer 84 multiplexes VBID during the VBIs of all the fields based on this held control information.

As has been described, the optical disc recorder/player 1 of the above embodiment inserts, as a C_PCK, display control information and copy control information that have been multiplexed during VBIs into VOBUs when converting a television (or video) signal to record it onto the present optical disc. As a result, the present optical disc recorder/player can control, for each VOBU, the recording onto and the playing from the optical disc using the display control information and copy control information. To generate such VOBUs, the system controlling unit 1402 merely needs to output control information to the encoding unit 1404 whenever the system controlling unit 1402 has been notified by the encoding unit 1404 that the encoding for one VOBU has been completed, and the encoding unit 1404 merely needs to insert one C_PCK into a start of each VOBU. As this operation to insert a C_PCK is simple, the operation load of the encoding unit 1404 is very small.

Aspect Ratio set in DCI of control information is used by the optical disc recorder/player 1 as follows. When recording, for instance, a movie program with an aspect ratio of 16:9 together with commercials with an aspect ratio of 4:3 which are broadcasted at intervals of the movie, the optical disc recorder/player 1 sets "16:9" as the Aspect Ratio shown in DCI of a C_PCK in each VOBU that correspond to the movie, and "4:3" as the Aspect Ratio in a C_PCK of each VOBU that correspond to the commercials. In this way, the aspect ratio for each VOBU is recorded. When reproducing this movie, the optical disc recorder/player 1 has the VBI signal multiplexer 84 multiplex VBID containing these aspect ratios into a video signal.

The letterbox control information set in the Aspect Ratio is used by the optical disc recorder/player 1 as follows. When recording a movie given the letterbox control information showing that images for the movie have an aspect ratio of 16:9 and should be displayed in a top part of the screen, together with commercials given the letterbox control information showing that the commercials have an aspect ratio of 16:9 and should be displayed in the center of the screen, for instance, the optical disc recorder/player 1 inserts suitable letterbox control information into a C_PCK of each VOBU based on VBI data. As a result, the letterbox controlling changes when the content of the program is switched from the movie to a commercial or vice versa. When reproducing these recorded programs, the optical disc recorder/player 1 has the VBI signal multiplexer 84 multiplex VBID containing the letterbox control information into a video signal. Accordingly, letterbox control information for each VOBU can be effectively used even after programs are recorded on the optical disc.

Subtitling Mode set in DCI of the control information is used by the optical disc recorder/player 1 as follows. When consecutively recording, for instance, programs A to C that have subtitling modes showing that subtitles should be displayed in active image area, that no subtitles should be displayed, and that subtitles should be displayed out of active image area, respectively the optical disc recorder/player 1 records the programs A to C as one VOB, in which VOBUs corresponding to each program have a C_PCK containing the Subtitling Mode appropriate for the program. Accordingly, Subtitling Mode can be effectively used for each program even after the program is recorded on the optical disc.

Film/Camera Mode set in DCI of the control information is used as follows. An image recorded on a film is usually composed of 24 fields per second, while an image recorded by a TV camera for NTSC is composed of 30 frames (i.e., 60 fields). When the Film Mode is set for a video signal, the number of frames for the video signal has been changed from 24 frames to 30 frames per second as a result of six frames being added to the original 24 frames.

Film/Camera Mode is useful when another recording device re-encodes an analog video signal or digital video data outputted from the optical disc recorder/player 1. In more detail, when the optical disc recorder/player 1 sets Film Mode and Camera Mode in each VOBU that corresponds to a movie program and a commercial, respectively, and reproduces a VOB made up by the two VOBUs for the commercial, the VBI signal multiplexer 84 or the data transfer unit 83 outputs an analog video signal or a digital video data. When the other recording device in the periphery of the optical disc player/recorder 1 receives this video signal or video data, it can detect whether Film Mode or Camera Mode is given to the signal or the data. The recording device therefore can distinguish the added six frames from other 24 frames when re-encoding the signal or data. This can prevent the image quality from being degraded as a result of the re-encoding. In this way, the optical disc recorder/player 1 can provide Film/Camera Mode for each VOBU with other recording devices.

CGMS set in CCI of the control information is used as follows.

When VBID detected by the VBID detecting unit 731 shows prohibition of the copying, the switch 82 becomes off and the DVD recorder 75 stops the recording. As the copying can be prohibited in units of VOBUs, the copyright of productions such as a program can be protected.

When VBID detected by the VBID detecting unit 731 shows that first-generation copies can be generated, the CCI generating unit 734 sets "copying is prohibited" in the CCI data while the DVD recorder 75 performs the recording onto the optical disc. Accordingly, the copying can be controlled for each VOBU as desired by a producer or an owner of a program or the like, such as by merely allowing the first-generation copies to be generated.

When VBID detected by the VBID detecting unit 731 shows that the copying is permitted without restrictions, the CCI generating unit 734 sets "copying is permitted without restrictions" in the CCI data, while the DVD recorder 75 performs the recording onto the optical disc. Accordingly, the copying can be controlled for each VOBU as desired by the producer or the owner of the program such as by allowing the copying limitlessly.

APSTB in CCI of the control information is used as follows. APS is a technique to degrade quality of images that have been recorded by an analog VTR without affecting reproduction by a TV so as to prevent the images from being recorded by the analog VTR and protect the copyright for the images. When recording an analog video signal to which APS is applied, the optical disc recorder/player 1 sets APSTB in the CCI for each VOBU. When reproducing the video signal, the VBI signal multiplexer 84 apply APS to the video signal based on APSTB set in the CCI. This makes is possible to control the recording by the analog VTR for each VOBU. In this way, the copyright can be protected in units of VOBUs using the APS. Accordingly, the copying control such as allowing the copying of only a start of a program or a part of a commercial can be performed.

4. Modified Examples

The TV set 2 and the optical disc recorder/player 1 shown in FIG. 1 may be the same device, such as by integrating the optical disc recorder/player 1 into the TV set 2.

The above embodiment describes the optical disc recorder/player 1 of the present invention to be used in place of a standard VTR as shown in FIG. 1 although the present optical disc recorder/player may be embodied by an information processing device such as a personal computer (PC) that includes a DVD-RAM drive unit, a video capture board (or a TV tuner board), and an MPEG encoder/decoder. In this case, the VBI data multiplexer 73 and the VBI signal multiplexer 84 may be included in the video capture board or the TV tuner board, and the MPEG encoder/decoder may encode and decode a VOB containing C_PCKs. This MPEG encoder/decoder does not have to be hardware and may achieved by software that encodes and decodes a VOB.

The above information processing device may record and reproduce a VOB containing C_PCKs by executing a recording program and a reproducing program. These recording -and reproducing programs may be stored into a computer-readable recording medium to be executed by other similar hardware so that the optical disc recorder/player of the above embodiment can be achieved.

A C_PCK in the above embodiment can be also called "RDI_PCK" (Real Time Data Information Pack), and may additionally contain information such as a presentation start time of the first video field in a VOBU, a recording time (duration) of the VOBU, and manufacturer's information showing information such as relating to a program producer.

The optical disc recorder/player 1 of the above embodiment receives a broadcast wave and demodulates the broadcast wave to obtain a TV signal by using the HF receiving unit 71 and the image demodulator 72. The optical disc recorder/player 1 may also contain an inputting unit for receiving an analog video signal such as for S-VHS and outputting the received analog video signal to the buffer 81 and the VBI data demodulator 73.

V_ATR of the above embodiment may contain all the contents of DCI, CCI, and DCI_CCI_SS together with application flags that correspond to Aspect Ratio, Subtitling Mode, Film/Camera Mode, CGMS, APSTB, and Source. As a result, control information for each VOB and VOBU can be set in V_ATR and a C_PCK, respectively, with application flags showing whether control information in the V_ATR or the C_PCK should be used.

As mentioned earlier, M_VOB_STI that contains a V_ATR can be shared by a plurality of VOBs. In this case, the system controlling unit 1402 performs operations in step S248 in FIG. 24 as follows. The unit 1402 compares M_VOB_STI generated in step S247 with other M_VOB_STI present in the management information file to detect whether M_VOB_STI that has the same content as the generated M_VOB_STI exists. When detecting that such M_VOB_STI exists, the system controlling unit 1402 does not insert the generated M_VOB_STI into the management information file in step S248, and instead sets the number showing the M_VOB_STI present in the file in VOBI that corresponds to the current VOB that has been recorded. When M_VOB_STI is shared by a plurality of VOBs in this way, it becomes possible to prevent a size of the management information file from continuing to increase.

In the above embodiment, every VOBU that makes up a VOB either contains a C_PCK or contains no C_PCKs at all. This is desirable in that the processing by the DVD recorder 75 to generate a VOBU can be simplified and so the operation load of the DVD recorder 75 can be reduced. It is alternatively possible that a VOB is composed of VOBUs some of which contain a C_PCK and some of which does not. In this case, control information contained in a VOBU may be used for other VOBUs that do not contain C_PCK and that are placed behind the VOBU. This is useful in that a data size of each VOB can be reduced.

In the above embodiment, the VBI data multiplexer 73 outputs control information corresponding to each field to the DVD recorder 75. Before outputting the control information to the DVD recorder 75, the VBI data multiplexer 73 may judge whether the control information is reliable or whether the same control information has been sent for a predetermined duration, and may output it to the DVD recorder 75 only when giving the affirmative judgement.

In the above embodiment, the system controlling unit 1402 selects, out of control information inputted from the VBI data multiplexer 73, suitable control information for each VOBU. After storing control information inputted form the VBI data multiplexer 73, the VBI data multiplexer 73 may detect a point at which the content of the stored control information changes, and control the encoding unit 1404 to position the detected point in the control information at a start of a VOBU.

A value "10b" of CGMS in DCI may be used to show that "the first-generation copy may be generated" although this value of CGMS shows that "condition is not used" in the above embodiment. In the former case, when receiving a video signal recorded by a user with a video camera and recording this video signal as a video object onto a DVD-RAM, for instance, the optical disc recorder/player may set one of "copying is permitted without restrictions", "the first-generation copy may be generated", and "no more copying is permitted" according to a user selection. The user may set "copying is permitted without restrictions" or "the first-generation copy may be generated" for CGMS when the video data (object) on the DVD-RAM is used as a master for the copying, and may set "no more copying is permitted" when the video data on the DVD-RAM is hot used as a master, for instance.

In the above embodiment, a VOB is described using an M_VOB containing V_PCKs as an example. However, a VOB for the present invention may be an S_VOB (Still Picture_VOB) that contains an S_PCK (Still Picture Pack). In this case, a control pack may be loaded into each VOBU in an S_VOB.

The above embodiment states that values other than "0000b" and "0001b" of four bits (b7–b4) in FIG. 5 are used for the letter box control. However, each of these values may additionally show an aspect ratio of, for instance, 4:3 or 16:9, for an image composed of active image area and areas out of the active image area, such as the image containing black parts in FIG. 6.

If a recording stop signal is outputted in step S174 of FIG. 17, the DVD recorder 75 may stop the recording processing, and be set in an idle state where a user operation input is awaited.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

Industry Applicability

The optical disc recorder/player of the present invention records a video object unit composed of video object units onto an optical disc while recording information showing display control and copying control for each video object unit having a reproduction time of one second or shorter. When reproducing the video object from the optical disc, the optical disc recorder/player performs display control and copying control based on the recorded information. Accordingly, the present invention is suited to an optical disc recorder/player that receives a video signal, records it as a video object onto an optical disc, and reproduces the recorded video object from the optical disc.

What is claimed is:

1. A recordable optical disc on which at least one video object is recorded, wherein each video object contains at least one video object unit, each video object unit contains control information and video data, and the control information contains:

Analog Protection System (APS) information showing a type of a copy protection method for the video object unit; and status information showing whether the APS information is valid.

2. An optical disc recorder that records at least one video object containing at least one video object unit onto an optical disc, the optical disc recorder comprising:

extracting means for extracting additional data from a signal containing a video signal, the additional data relating to at least one of display control and copy control;

encoding means for encoding the video signal to generate video data;

first generating means for generating, based on the extracted additional data, control information that contains Analog Protection System (APS) information showing a type of a copy protection method and status information showing whether the APS information is valid; and second generating means for generating each video object unit, which contains the control information and the video data.

3. An optical disc player that reproduces at least one video object recorded on an optical disc, wherein each video object contains at least one video object unit, and each video object unit contains control information and video data, the control information contains Analog Protection System (APS) information showing a type of a copy protection method for the video object unit and status information showing whether the APS information is valid, the optical disc player comprising:

reading means for reading each video object from the optical disc; and separating means for separating each video object unit in the read video object into video data and control information.

4. A recording method for recording at least one video object containing at least one video object unit onto an optical disc, the recording method comprising:

extracting additional data from a signal containing a video signal, the additional data relating to at least one of display control and copy control;

encoding the video signal to generate video data;

generating, based on the extracted additional data, control information that contains Analog Protection System (APS) information showing a type of a copy protection method and status information showing whether the APS information is valid; and generating each video object unit, which contains the control information and the video data.

5. A reproduction method for reproducing at least one video object recorded on an optical disc, wherein each video object contains at least one video object unit, and each video object unit contains control information and video data, the control information contains Analog Protection System (APS) information showing a type of a copy protection method for the video object unit and status information showing whether the APS information is valid, the reproduction method comprising:

reading each video object from the optical disc; and separating each video object unit in the read video object into video data and control information.

* * * * *

UNITED STATES PATENT AND TRADEMARK OFFICE
CERTIFICATE OF CORRECTION

PATENT NO. : 6,370,321 B1
DATED : April 9, 2002
INVENTOR(S) : Shin Asada et al.

It is certified that error appears in the above-identified patent and that said Letters Patent is hereby corrected as shown below:

Column 4,
Line 5, change "FIGS" to -- FIGs --.

Column 5,
Line 59, insert -- ) -- after "information".

Column 8,
Line 12, change " 2 KB" to -- 2KB --.
Line 13, change "control" to -- Control --.
Line 42, change "14 B" to -- 14B --.
Line 42, change " 24 B" to -- 24B --.
Line 43, change "(2010 B)" to -- (2010B) --.
Line 44, change "(6 B) to -- (6B) --.
Line 44, change "(1 B)" to -- (1B) --.
Line 44, change "(2003 B)" to -- (2003B) --.

Column 9,
Line 21, change "000b:" to -- 0000b: --.

Column 14,
Line 23, change "b5" to -- b8 --.

Column 15,
Line 5, change "FIGS" to -- FIGs --.
Line 32, change "bB" to -- b8 --.
Line 49, change "CCI SS" to -- CCI_SS --.
Line 56, change "FIGS" to -- FIGs --.

Column 19,
Line 27, change "M VOB STI" to -- M_VOB_STI --.

UNITED STATES PATENT AND TRADEMARK OFFICE
CERTIFICATE OF CORRECTION

PATENT NO.    : 6,370,321 B1
DATED         : April 9, 2002
INVENTOR(S)   : Shin Asada et al.

It is certified that error appears in the above-identified patent and that said Letters Patent is hereby corrected as shown below:

<u>Column 20,</u>
Line 7, change "tack" to -- track --.

<u>Column 22,</u>
Line 37, change "is" to -- it --.
Line 64, delete "----" between "recording" and "and".

<u>Column 23,</u>
Line 62, change "form" to -- from --.

<u>Column 24,</u>
Line 15, change "hot" to -- not --.

Signed and Sealed this

Nineteenth Day of November, 2002

*Attest:*

*Attesting Officer*

JAMES E. ROGAN
*Director of the United States Patent and Trademark Office*